United States Patent
Li et al.

(10) Patent No.: US 12,513,274 B2
(45) Date of Patent: Dec. 30, 2025

(54) IMAGE PROCESSING AND DISPLAY METHOD, AND DEVICE

(71) Applicants: Beijing BOE Optoelectronics Technology Co., Ltd., Beijing (CN); BOE Technology Group Co., Ltd., Beijing (CN)

(72) Inventors: Wenyu Li, Beijing (CN); Jinghua Miao, Beijing (CN); Hao Zhang, Beijing (CN); Lili Chen, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 10 days.

(21) Appl. No.: 18/759,896

(22) Filed: Jun. 30, 2024

(65) Prior Publication Data

US 2024/0357066 A1 Oct. 24, 2024

Related U.S. Application Data

(63) Continuation-in-part of application No. 17/609,636, filed as application No. PCT/CN2020/139346 on Dec. 25, 2020, now Pat. No. 12,118,690.

(51) Int. Cl.
*G06F 3/045* (2006.01)
*H04N 13/139* (2018.01)
(Continued)

(52) U.S. Cl.
CPC ......... *H04N 13/139* (2018.05); *H04N 13/194* (2018.05); *H04N 13/366* (2018.05); *H04N 13/398* (2018.05)

(58) Field of Classification Search
CPC ........ G06F 3/011; G06F 3/012; G06F 3/1407; G06F 3/147; G06T 2207/20021;
(Continued)

(56) References Cited

U.S. PATENT DOCUMENTS

2012/0119097 A1* 5/2012 Nishino ............... A61B 6/4283
250/370.08
2014/0015867 A1 1/2014 Xin et al.
(Continued)

FOREIGN PATENT DOCUMENTS

CN 101697114 A 4/2010
CN 103501418 A 1/2014
(Continued)

OTHER PUBLICATIONS

PCT/CN2020/139346 international search report and written opinion dated Sep. 26, 2021.
(Continued)

*Primary Examiner* — Insa Sadio
(74) *Attorney, Agent, or Firm* — IPro, PLLC

(57) ABSTRACT

Provided is an image display method. The image display method is applicable to a display component of an extended reality (XR) device further including a processing component. The image display method includes: receiving an image from the processing component; displaying the image from the processing component at a first frame rate in response to posture information of a user of the XR device reaching a preset parameter; and displaying the image from the processing component at a second frame rate in response to the posture information of the user of the XR device not reaching the preset parameter, the second frame rate being lower than the first frame rate.

20 Claims, 10 Drawing Sheets

(51) Int. Cl.
*H04N 13/194* (2018.01)
*H04N 13/366* (2018.01)
*H04N 13/398* (2018.01)

(58) Field of Classification Search
CPC ............ G06T 2207/20221; G06T 3/40; G06T 3/4092; G06T 5/50; G09G 2340/0435; G09G 2340/045; G09G 2354/00; G09G 2370/04; G09G 2370/042; G09G 5/006; G09G 5/391; H04N 7/01
See application file for complete search history.

(56) References Cited

U.S. PATENT DOCUMENTS

| | | | |
|---|---|---|---|
| 2016/0316138 A1* | 10/2016 | Uemura | G03B 15/00 |
| 2018/0018931 A1 | 1/2018 | Zhang | |
| 2018/0336867 A1 | 11/2018 | Gu et al. | |
| 2020/0195997 A1 | 6/2020 | Yoshikawa et al. | |

FOREIGN PATENT DOCUMENTS

| | | |
|---|---|---|
| CN | 105653224 A | 6/2016 |
| CN | 110827380 A | 2/2020 |
| WO | 2019054360 A1 | 3/2019 |

OTHER PUBLICATIONS

U.S. Appl. No. 17/609,636 Notice of allowance dated Apr. 30, 2024.

\* cited by examiner

IMAGE PROCESSING AND DISPLAY METHOD, AND DEVICE

This application is a continuation-in-part application of U.S. application Ser. No. 17/609,636, filed on Nov. 8, 2021, the content of which is incorporated herein by reference.

TECHNICAL FIELD

The present disclosure relates to the field of display technologies, and in particular relates to an image processing and display method, and a device.

BACKGROUND

A display device is a device for displaying images and includes a processing component and a display component.

According to an image display method, the processing component in the display device processes an image of a predetermined resolution and transmits the image of the resolution to the display component, and the display component displays the image.

However, in the above image display method, the frame rate at which the display component displays images is merely decided by the performance of the processing component, and thus the flexibility is low.

SUMMARY

Embodiments of the present disclosure provide an image display method, an image processing method, and a display device.

According to some embodiments of the present disclosure, an image display method is provided. The image display method is applicable to a display component of an extended reality (XR) device. The XR device further includes a processing component, and the image display method includes:
  receiving an image from the processing component;
  displaying the image from the processing component at a first frame rate in response to posture information of a user of the XR device reaching a preset parameter; and
  displaying the image from the processing component at a second frame rate in response to the posture information of the user of the XR device not reaching the preset parameter, the second frame rate being lower than the first frame rate.

In some embodiments, in the case that the posture information of the user of the XR device reaches the preset parameter, the image from the processing component is an image obtained by splicing a plurality of frames of images, and displaying the image from the processing component at the first frame rate includes:
  splitting the image from the processing component into the plurality of frames of images;
  respectively scaling up the plurality of frames of images to obtain a plurality of scaled-up images of a target resolution, wherein the target resolution is equal to a physical resolution of the display component; and
  displaying the plurality of scaled-up images of the target resolution at the first frame rate.

In some embodiments, in the case that the posture information of the user of the XR device does not reach the preset parameter, the image from the processing component is one of n images obtained by cropping a frame of image; displaying the image from the processing component at the second frame rate includes:
  in the case that the posture information of the user of the XR device does not reach the preset parameter and the n images from the processing component are received, splicing the n images from the processing component into the frame of image and displaying the frame of image as spliced at the second frame rate, wherein n is greater than or equal to 2.

In some embodiments, the image display method further includes:
  acquiring indication information transmitted by the processing component, wherein the indication information is determined by the processing component based on the posture information of the user provided by a sensor; and
  determining, based on the indication information, whether the posture information of the user of the XR device reaches the preset parameter or not.

In some embodiments, the acquiring the indication information transmitted by the processing component includes:
  acquiring the indication information from a preset region in the image from the processing component.

According to some embodiments of the present disclosure, an image processing method is provided. The method is applicable to a processing component of an extended reality (XR) device. The XR device further includes a display component, and the image processing method includes:
  acquiring posture information of a user of the XR device provided by a sensor;
  transmitting an image to the display component such that the display component displays the image at a first frame rate in response to the posture information of the user of the XR device reaching a preset parameter; and
  transmitting an image to the display component such that the display component displays the image at a second frame rate in response to the posture information of the user of the XR device not reaching the preset parameter, the second frame rate being lower than the first frame rate.

In some embodiments, transmitting the image to the display component such that the display component displays the image at the first frame rate includes:
  acquiring an image of a first resolution, wherein the image of the first resolution is obtained by splicing a plurality of frames of images; and
  transmitting the image of the first resolution to the display component, wherein the display component is configured to scale up the plurality of frames of images to obtain a plurality of scaled-up images and display the plurality of scaled-up images at the first frame rate In some embodiments, acquiring the image of the first resolution includes:
  acquiring a plurality of frames of images; and
  splicing the plurality of frames of images into the image of the first resolution.

In some embodiments, acquiring the image of the first resolution includes:
  transmitting a first image acquisition request including the posture information to a server; and
  receiving the image of the first resolution from the server.

In some embodiments, acquiring the image of the first resolution includes:
  transmitting a first image acquisition request including the posture information to a server;
  receiving a plurality of frames of images from the server; and splicing the plurality of frames of images into the image of the first resolution.

In some embodiments, transmitting the image to the display component such that the display component displays the image at the second frame rate includes:
  obtaining a frame of image of a third resolution;
  cropping the frame of image of the third resolution into n images of the second resolution, wherein n is greater than or equal to 2;
  successively transmitting the n images of the second resolution to the display component, wherein the n images of the second resolution are configured to form the frame of image of the third resolution of the display component such that the display component displays the image of the third resolution at the second frame rate.

In some embodiments, acquiring the frame of image of the third resolution includes:
  acquiring posture information at a current moment of a head of the user of the XR device; and
  acquiring the image of the third resolution based on the posture information at the current moment.

In some embodiments, acquiring the image of the third resolution includes:
  transmitting a second image acquisition request including the posture information to a server; and
  receiving the image of the third resolution from the server.

In some embodiments, after transmitting the second image acquisition request including the second posture information to the server, the image processing method further includes:
  generating an image of a fourth resolution, wherein the fourth resolution is lower than the third resolution;
  transmitting the image of the fourth resolution to the display component; and
  stopping generating the image of the fourth resolution in response to receiving the image of the third resolution from the server.

In some embodiments, a preset region in the image of the first resolution includes first indication information, and the first indication information indicates to the display component that the posture information reaches the preset parameter.

In some embodiments, a preset region in the image of the second resolution includes second indication information, and the second indication information indicates to the display component that the posture information does not reach the preset parameter.

In some embodiments, the posture information of the user of the XR device includes a rotation speed of a head of the user, and the preset parameter includes a rotation speed threshold.

According to some embodiments of the disclosure, an extended reality (XR) device is provided. The XR device includes a processing component and a display component.
  the processing component is configured to acquire posture information of a user of the XR device provided by a sensor;
  in a case that the posture information of the user of the XR device reaches a preset parameter, the processing component transmits an image to the display component and the display component displays the image at a first frame rate; and
  in a case that the posture information of the user of the XR device does not reach the preset parameter, the processing component transmits an image to the display component and the display component displays the image at a second frame rate, the second frame rate being lower than the first frame rate.

In some embodiments, the processing component is configured to obtain a plurality of frames of images, and splice the plurality of frames of images into an image of a first resolution;
  the processing component is configured to transmit the image of the first resolution to the display component;
  the display component is configured to split the image of the first resolution into the plurality of frames of images; and
  the display component is configured to respectively scale up the plurality of frames of images to obtain a plurality of scaled-up images of a target resolution and display the plurality of scaled-up images of the target resolution at the first frame rate, the target resolution being equal to a physical resolution of the display component.

In some embodiments, the processing component is configured to obtain a frame of image of a third resolution;
  the processing component is configured to crop the frame of image of the third resolution into n images of the second resolution and transmit the n images of the second resolution to the display component, wherein n is greater than or equal to 2; and
  the display component is configured to splice the n images of the second resolution into the frame of image of the third resolution and display the frame of image of the third resolution at the second frame rate.

In some embodiments, the processing component is further configured to: acquiring first posture information of a head of the user of the XR device;
  transmitting a first image acquisition request including the first posture information to a server; and
  receiving the image of the first resolution from the server.

According to some embodiments of the disclosure, a computer program product or computer program is provided. The computer program product or computer program includes computer instructions, and the computer instructions are stored in a computer-readable storage medium. A processor of a computer device reads the computer instructions from the computer-readable storage medium, and executes the computer instruction, such that the computer device performs the methods according to any of the embodiments described above.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may derive other drawings from these accompanying drawings without creative efforts.

The above drawings have shown the specific embodiments of the present disclosure, and the embodiments will be described in more detail later. These drawings and text descriptions are not intended to limit the scope of the concept of the present disclosure in any way, but to explain the concept of the present disclosure for those skilled in the art by referring to specific embodiments.

DETAILED DESCRIPTION

For clearer descriptions of the objectives, technical solutions, and advantages of the present disclosure, embodiments of the present disclosure are described in detail hereinafter with reference to the accompanying drawings.

Figure 1:
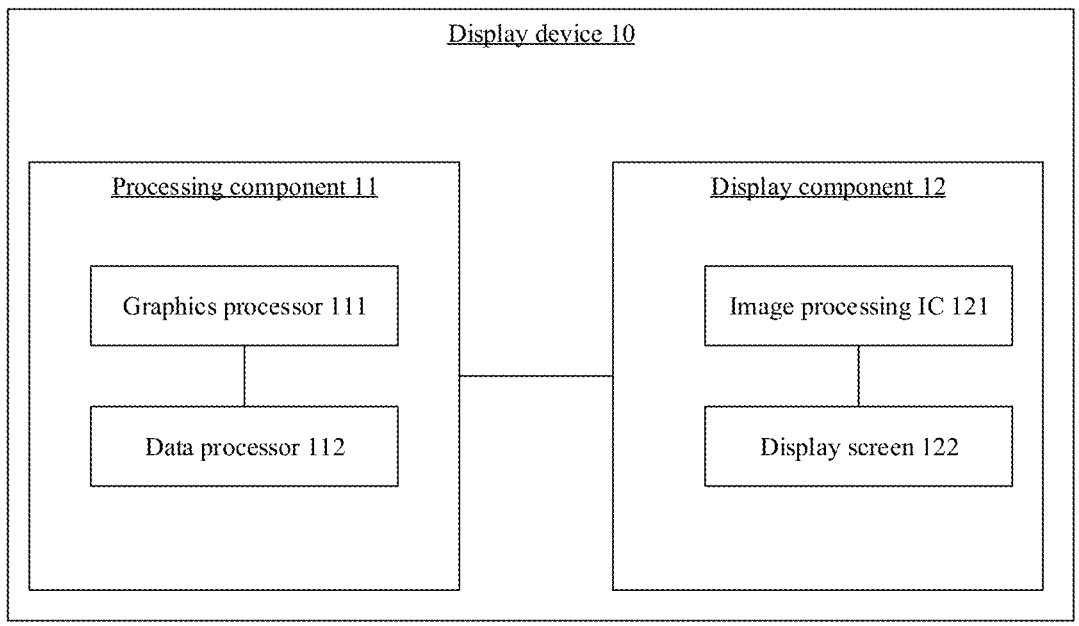
FIG. 1 is a schematic diagram of a display device according to some embodiments of the present disclosure.

A display device is a device with image processing and image display functions. FIG. 1 is a schematic diagram of a display device according to an embodiment of the present disclosure. The display device 10 includes a processing component 11 and a display component 12.

The processing component 11 may include a graphics processor (such as a graphics processing unit (GPU)) 111 and a data processor (such as a central processing unit (CPU)) 112. The data processor 112 receives external data (such as image information) and controls the graphics processor 111. The graphics processor 111 performs processing such as rendering on an image and transmits the image to the display component 12.

The processing component 11 may be an image processing host.

The display component 12 may include an image processing integrated circuit (IC) 121 and a display screen 122. The image processing integrated circuit 121 may receive the image transmitted by the graphics processor 111, and transmit the image as processed to the display screen 122 for display.

Currently, due to software and other reasons, the resolution of the image output by the graphics processor 111 is difficult to change. In addition, the processing component 11 has limited image processing capabilities. Therefore, the resolution of the image output by the graphics processor 111 to the display component 12 is negatively correlated with the number of images that can be output per unit time, that is, the greater the resolution of the output image, the less the number of images output per unit time (accordingly, the lower the frequency of the processing component transmitting the image to the display component). In contrast, the lower the resolution of the output image, the more the number of images output per unit time (accordingly, the higher the frequency of the processing component transmitting the image to the display component).

It can be seen from the above that the higher the resolution of the image displayed by the display component, the lower the frequency of displaying the image (this frequency may be called frame rate), and the lower the resolution of the image displayed by the display component, the higher the frequency of displaying the image. Moreover, since the resolution of the image output by the graphics processor 111 is difficult to change after leaving the factory, this may cause the resolution and frame rate of the image displayed by the display component 12 to be difficult to adapt to various situations, and thus the flexibility is low.

In an exemplary embodiment, when a picture is a scene that changes quickly (such as a moving scene), if the frame rate of the picture displayed on the display screen is low, such as lower than 30 frames, the human eye may feel obvious non-smoothness. When the picture is a relatively static scene, if the resolution of the picture displayed on the display screen is low, the human eye may feel the picture is blurry. Therefore, when the display device leaves the factory, whether the output resolution of the processing component is set as a high resolution to achieve a fine picture of a static scene, or the output resolution of the processing component is set as a low resolution to achieve a smooth picture of a dynamic scene, it is difficult to satisfy the requirements of different situations.

An embodiment of the present disclosure provides an image display method. According to the methods, images are split or spliced to achieve two display modes of "high frame rate, low resolution" and "high resolution, low frame rate" to satisfy the needs of different scenes, greatly improving the display effect and user experience of the display device.

Figure 2:
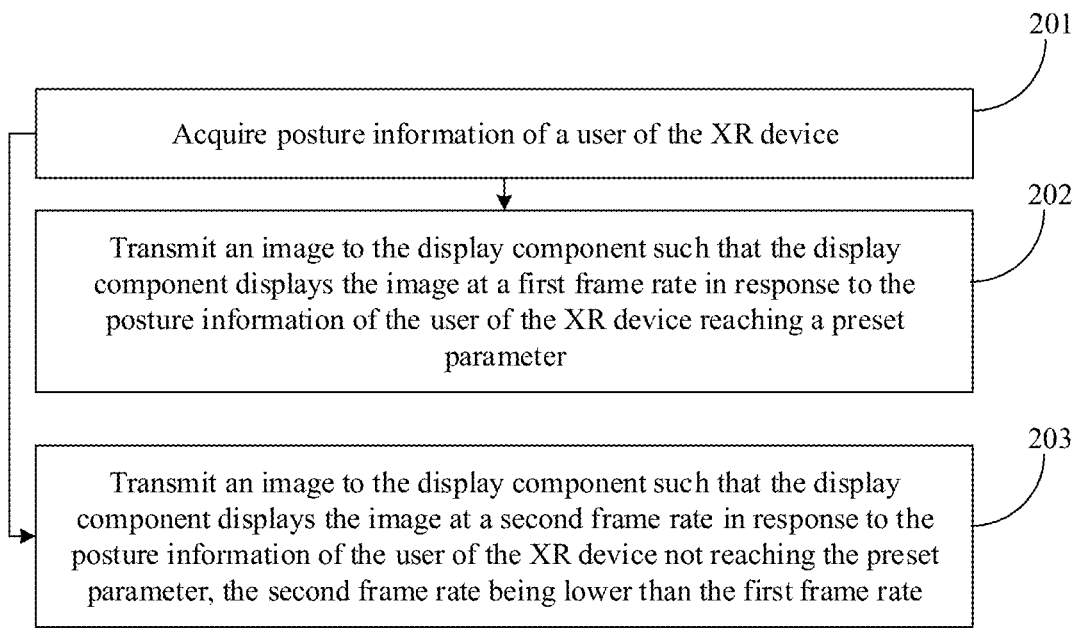
FIG. 2 is a flowchart of an image display method according to some embodiments of the present disclosure.

FIG. 2 is a flowchart of an image processing method according to an embodiment of the present disclosure. In this embodiment, the fact that the image processing method is applied to the processing component of the display device shown in FIG. 1 is taken as an example. The image processing method may include the following steps.

In step 201, posture information of a user of an extended reality (XR) device is acquired.

Figure 15:
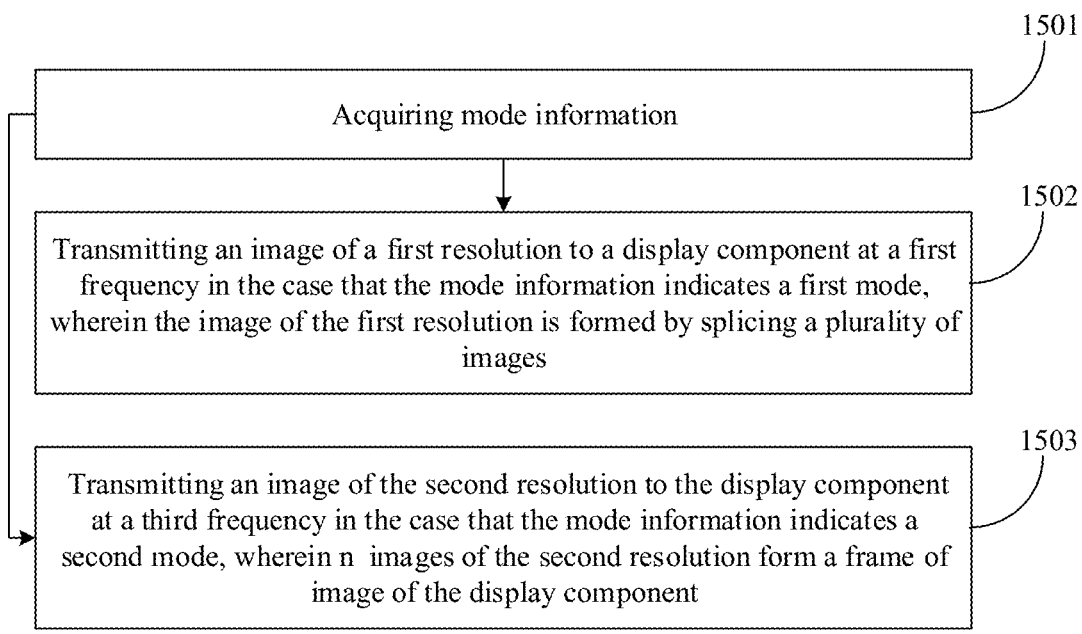
FIG. 15 is a flowchart of another image processing method according to some embodiments of the present disclosure.

In addition, refer to FIG. 15, which is a flowchart of another image processing method according to some embodiments of the present disclosure. Step 201 is referred to step 1501. In step 1501, the processing component obtains mode information, which is configured to indicate whether it is in the first mode or the second mode. In the case that the posture information reaches the preset parameters, it is considered to be in the first mode, and in the case that the posture information does not reach the preset parameters, it is considered to be in the second mode.

In step 202, in the cast that the posture information of the user of the XR device reaches a preset parameter, an image is transmitted to the display component such that the display component displays the image at a first frame rate.

Similarly, in step 1502, the processing component transmits the image of the first resolution at the first frequency to the display component in the first mode, and the first resolution image is formed by splicing a plurality of frames of images.

In step 203, in the cast that the posture information of the user of the XR device does not reach the preset parameter, an image is transmitted to the display component such that the display component displays the image at a second frame rate. The second frame rate is lower than the first frame rate.

Similarly, in step 1502, the processing component transmits the image of the second resolution to the display component at the first frame rate in the second mode, and n images of the second resolution are used to form one frame of image of the display component.

In summary, according to the image processing method provided by the embodiment of the present disclosure, in the cast that the posture information of the user reaches the preset parameter, the image is transmitted to the display component such that the display component displays the image at the higher first frame rate, and in the cast that the posture information of the user does not reach the preset parameter, the image is transmitted to the display component such that the display component displays the image at the lower second frame rate. Two display modes with different frame rates are provided, such that display methods are more abundant and the flexibility is high.

Figure 3:
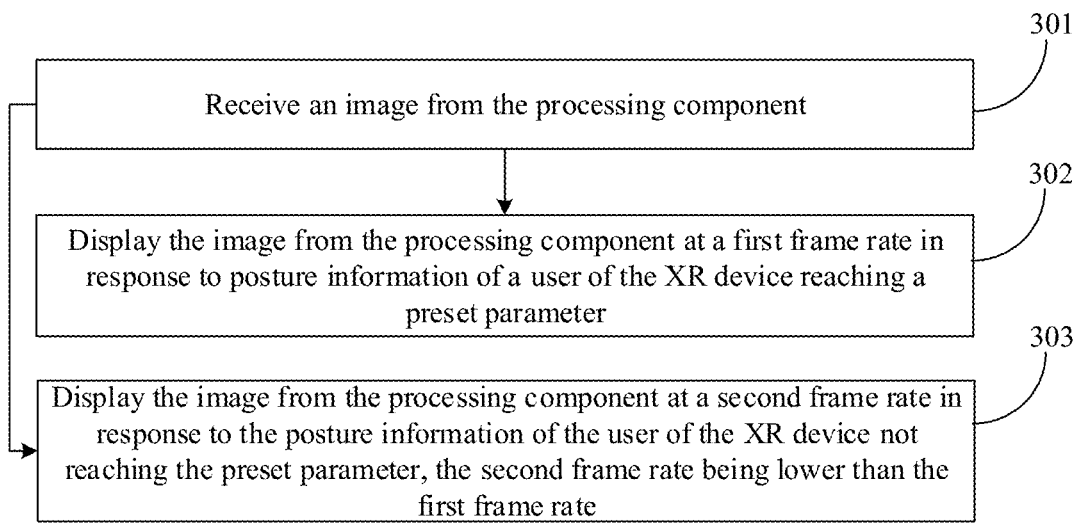
FIG. 3 is a flowchart of another image display method according to some embodiments of the present disclosure.

FIG. 3 is a flowchart of an image display method according to another embodiment of the present disclosure. In this embodiment, the fact that the image display method is applied to the display component of the display device shown in FIG. 1 is taken as an example. The image display method may include the following steps.

In step 301, an image from the processing component is received.

Figure 16:
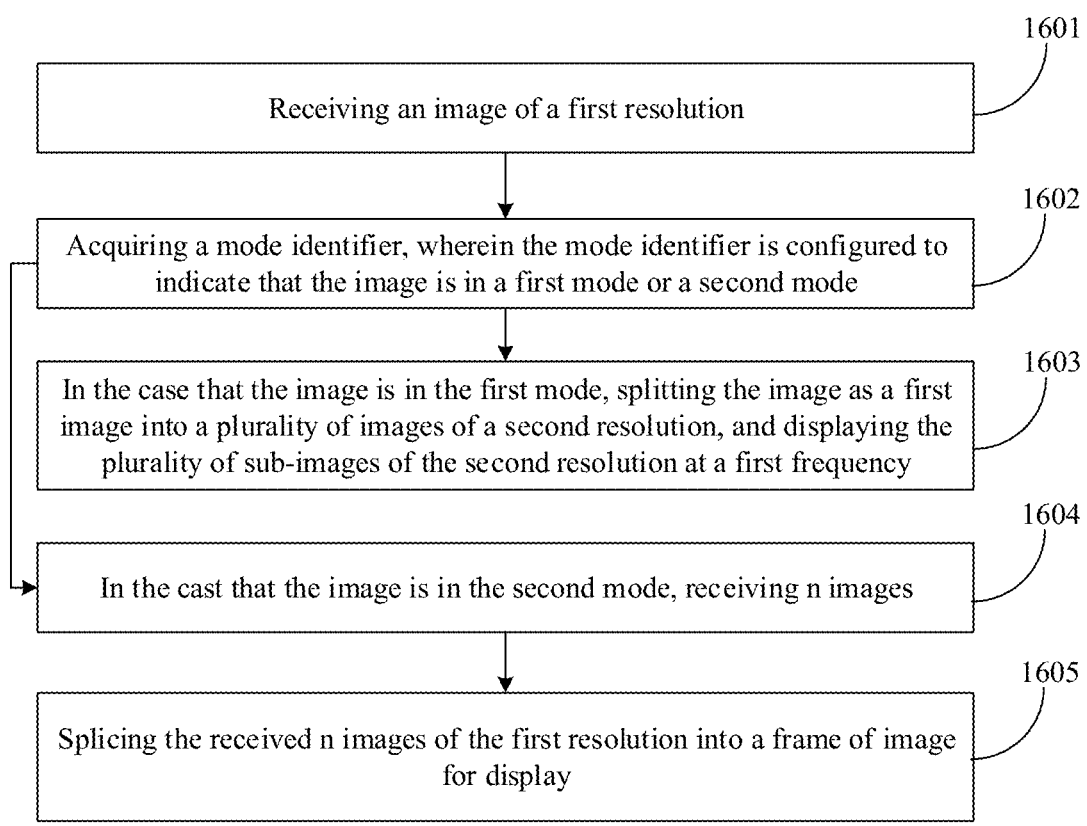
FIG. 16 is a flowchart of another image display method according to some embodiments of the present disclosure.

In addition, refer to FIG. 16, which is a flowchart of another image display method according to some embodiments of the present disclosure. Step 301 is referred to step 1601 and step 1602. The display component receives the image of the first resolution and obtains the mode identifier, which is configured to indicate whether it is in the first mode or the second mode.

In step 302, in the case that posture information of a user of the XR device reaches a preset parameter, the image from the processing component is displayed at a first frame rate.

Similarly, refer to step 1603, if the display component is in the first mode, the image from the processing component is determined as the image of the first resolution and is split into a plurality of images of the second resolution. The plurality of images of the second resolution is displayed at the first frame rate.

In step 303, in the case that the posture information of the user of the XR device does not reach the preset parameter, the image from the processing component is displayed at a second frame rate.

Similarly, refer to steps 1604 and 1605, if the display component is in the second mode, the display component receives n images, and the n images of the first resolution as received are spliced into one frame of image for display.

In summary, according to the image display method provided by the embodiment of the present disclosure, in the cast that the posture information of the user reaches the preset parameter, the image is transmitted to the display component such that the display component displays the image at the higher first frame rate, and in the cast that the posture information of the user does not reach the preset parameter, the image is transmitted to the display component such that the display component displays the image at the lower second frame rate. Two display modes with different frame rates are provided, such that display methods are more abundant and the flexibility is high.

Figure 4:
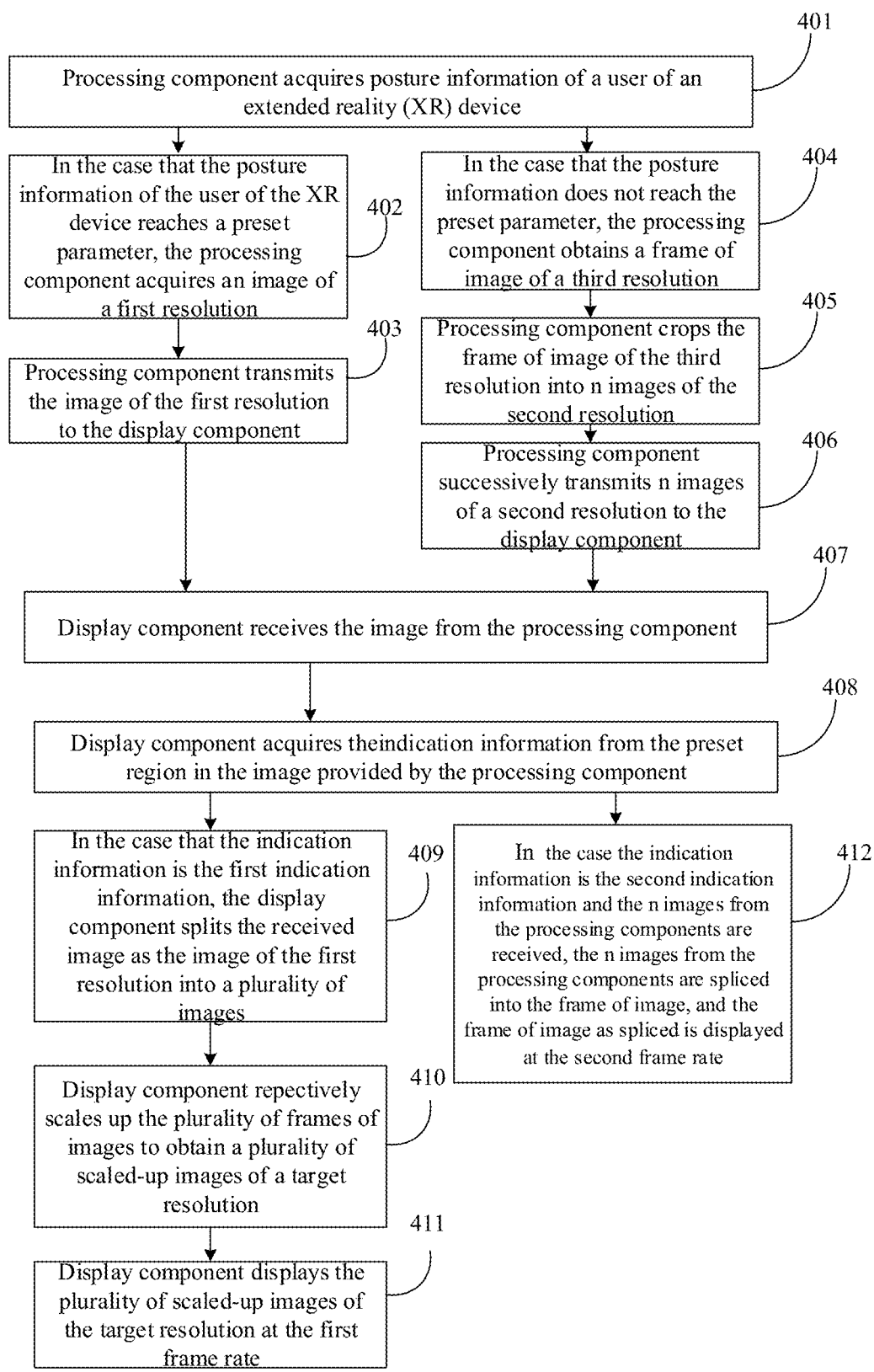
FIG. 4 is a flowchart of yet another image display method according to some embodiments of the present disclosure.

FIG. 4 is a flowchart of an image display method according to another embodiment of the present disclosure. In this embodiment, the fact that the image display method is applied to the display device shown in FIG. 1 is taken as an example. The image display method may include the following steps.

In step 401, a processing component acquires posture information of a user of an extended reality (XR) device.

The image display method according to the embodiment of the present disclosure is applicable to the XR device. Extended reality is a general term for virtual reality (VR), augmented reality (AR), and mixed reality (MR).

The display device shown in FIG. 1 is a part or all of the XR device.

The XR device includes a processing component and a wearable display. The wearable display may include a head-mounted display or a glasses display. The wearable display may be the display component 12 in the implementation environment shown in FIG. 1. The wearable display includes a sensor that collects the posture information of the user of the XR device and transmits the posture information to the processing component. The posture information refers to the posture information of the user's head.

The sensors in the wearable display include speed sensors, acceleration sensors, and angular velocity sensors, which are used to collect posture information of a user's head and adjust the picture accordingly.

The posture information of the user of the XR device includes various information such as movement information of the user's head.

In some embodiments, the posture information of the user of the XR device includes a rotation speed of the head of the user.

The processing component determines the rotation speed of the user's head based on parameters collected by the sensor, and the rotation speed may include an angular velocity of rotation along a certain axis (such as an x-axis perpendicular to the ground).

Figure 17:
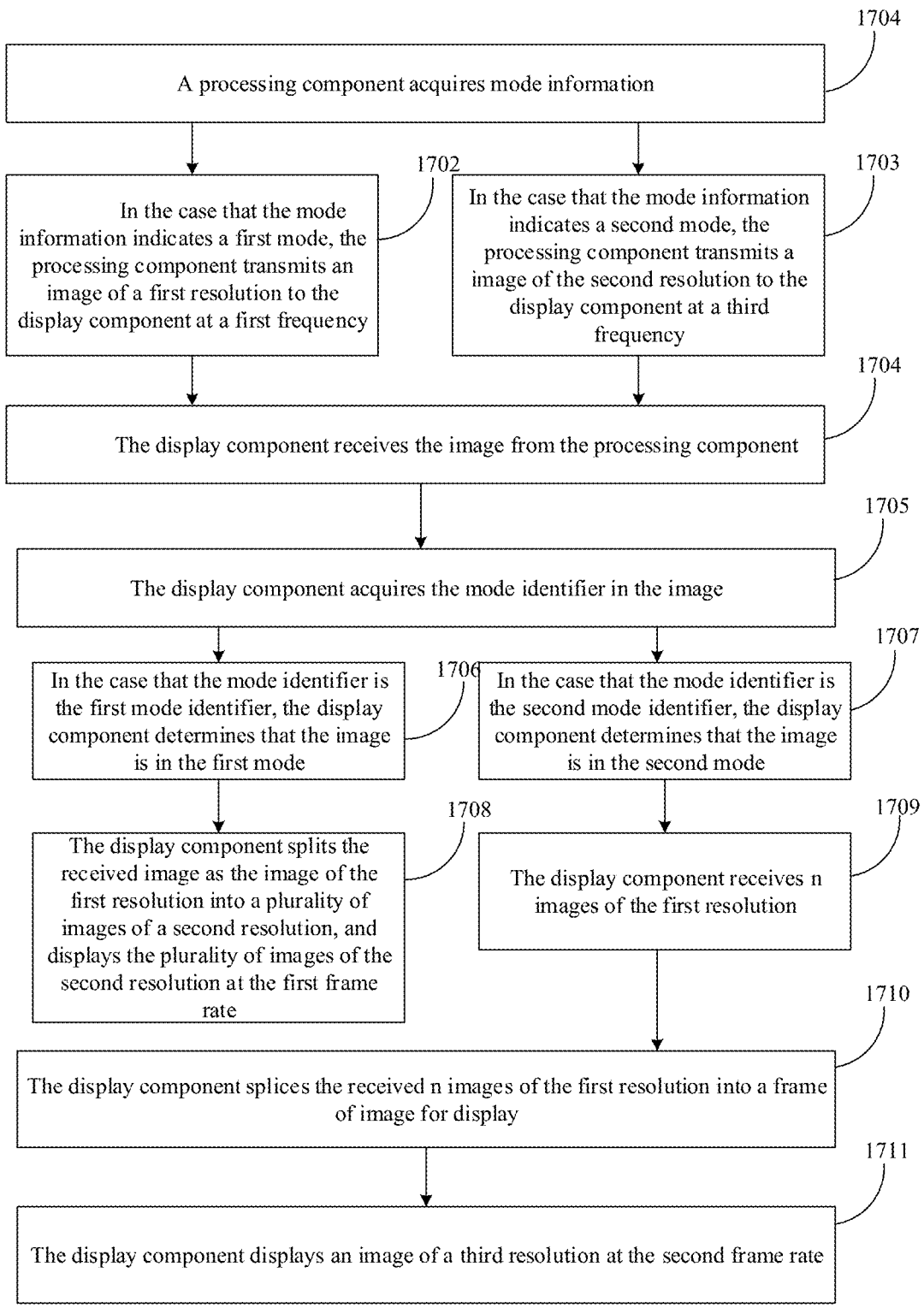
FIG. 17 is a flowchart of another image display method according to some embodiments of the present disclosure.

In addition, refer to FIG. 17, which is a flowchart of another image display method according to some embodiments of the present disclosure. Similar to the step, in step 1704, the processing component obtains mode information, which indicates whether it is in the first mode or the second mode. The first mode is "high frame rate mode" and the second mode can be "high resolution mode".

In step 402, in the case that the posture information of the user of the XR device reaches a preset parameter, the processing component acquires an image of a first resolution. Step 403 is performed.

The preset parameter includes a rotation speed threshold. In the case that the posture information reaches the preset parameter, it indicates that the rotation speed of the user's head is greater than the rotation speed threshold. In the case that the user's head is rotating rapidly. Correspondingly, the picture displayed by the display component is also in a dynamic scene with fast changes. In this case, the processing component transmits the image of the first resolution including a plurality of images, and the mode is referred to as a "high frame rate mode".

In some embodiments, the rotation speed threshold is determined based on the image processing capability of the processing component and the physical resolution of the display component (the physical resolution is an inherent parameter of the display screen of the display component, which may refer to the maximum number of pixels that may be displayed on the display screen). For example, the stronger the image processing capability of the processing component, the greater the rotation speed threshold, and the greater the physical resolution of the display component, the lower the rotation speed threshold.

In the case that the posture information reaches the preset parameter, the processing component acquires the image of the first resolution.

In some embodiments, the step includes the following sub-steps.

1) The processing component acquires a plurality of frames of images.

The data processor in the processing component receives or generates image information and transmits the image information to the graphics processor. The image information indicates the information of the image to be displayed, and the graphics processor processes the image to be displayed and generates a plurality of frames of images. The plurality of frames of images is continuous, and the resolution of each frame of image is lower than the physical resolution of the display component.

2) The processing component splices the plurality of frames of images into the image of the first resolution.

The processing component splices the plurality of frames of images as generated locally into the image of the first resolution. For example, the plurality of frames of images is spliced into one column to form the image of the first resolution, or the plurality of frames of images is spliced into one row to form the image of the first resolution, or the plurality of frames of images is spliced into multiple rows and multiple columns to form the image of the first resolution.

In addition, if the resolution of each frame is the fifth resolution, the fifth resolution is lower than the first resolution. In an exemplary embodiment, if the fifth resolution is 540×540 and the number of images is 4, then the first resolution may be 540×2160, that is, 4 images are spliced in the column direction. Of course, the fifth resolution may also be 1080×1080, which is not limited in the embodiment of the present disclosure.

The first resolution is a preset resolution of an image output by the processing component. The first resolution is determined by the transmission bandwidth between the processing component and the display component, and the greater the transmission bandwidth, the greater the first resolution.

It should be noted that the resolution or physical resolution of the display component in embodiments of the disclosure is the resolution or physical resolution of the display screen in the display component.

In some embodiment, step 402 further includes:
generating the image of the first resolution with first indication information in the preset region.

The first indication information indicates to the display component that the posture information reaches the preset parameter.

The image of the first resolution is rectangular, one or more pixels in four corners of the image will not be displayed by the display component. Therefore, the preset region is a region including corners in the image of the first resolution. In an exemplary embodiment, the processing component sets a first pixel in an upper left corner of the image of the first resolution as a white pixel, and adopts the white pixel as the first indication information. Alternatively, a plurality of pixels in the upper left corner of the image of the first resolution may form a graphic 1 to be used as the indication information.

The processing component informs the display component whether the posture information reaches the preset parameter by transmitting indication information to the display component. The indication information includes the first indication information and the second indication information (the first indication information indicates to the display component that the posture information does not reach the preset parameter). Adding the indication information to the image to be transmitted to the display component is one way that the component transmits information to the display component. In some embodiments, the processing component directly transmits the indication information to the display component, which is not limited by the present disclosure.

In step 403, the processing component transmits the image of the first resolution to the display component. Step 407 is preformed.

After acquiring the image of the first resolution, the processing component transmits the image of the first resolution to the display component.

Since the display is a continuous process, the processing component continuously transmits the image of the first resolution to the display component at the first frequency based on step 402 and step 403. Accordingly, the display component displays the plurality of images at the first frame rate. The frame rate is a frequency at which images displayed in units of frames appear continuously on the display component. Since the image of the first resolution reansmitted by the processing component to the display component includes a plurality of images that the display component can display in a plurality of frames, the first frequency is numerically greater than the first frame rate.

The first frequency may be a frequency determined based on the image processing capability of the processing component. The stronger the image processing capability of the processing component, the higher the first frequency, and the weaker the image processing capability of the processing component, the lower the first frequency. The first resolution is lower than or equal to the physical resolution of the display screen of the display component. The physical resolution is determined by the number of pixel units included in the display screen.

Similarly, step 402 and step 403 refer to step 1702 in FIG. 17, if the mode information indicates the first mode, the processing component transmits the image of the first resolution to the display component at the first frequency.

In step 404, in the case that the posture information does not reach the preset parameter, the processing component obtains a frame of image of a third resolution. Step 405 is performed.

When the posture information does not reach the preset parameter, that is, the rotation speed of the user's head is lower than or equal to the rotation speed threshold, it indicates that the user's head is not rotating fast. At this time, the processing component generates and renders the image of the third resolution based on the image information as received or the image information as generated locally.

When applied to the XR device, the processing component acquires posture information at a current moment of a head of the user of the XR device, and acquires the image of the third resolution based on the posture information at the current moment. Since the third resolution is larger (such as greater than the first resolution), the processing component generates the third resolution several times, such as generating an image of the second resolution each time, and generates n (n≥2) images of the second resolution in total to form the image of the third resolution. For each time, the processing component generates an image of the second resolution based on the posture information at the current moment. When the user moves, the processing component may generate different images of the second resolution based on different posture information, and the n images of the second resolution may have edge misalignment problems. The present disclosure avoids the problems by acquiring the image of the third resolution based on the posture information at the current moment.

Optionally, step 404 includes the following sub-steps.

The image of the third resolution includes n images of the second resolution, When generating the image of the third resolution, the processing component sets the second indication information in the preset region of the image of the second resolution.

The second indication information indicates to the display component that the posture information does not reach the preset parameter.

The image of the second resolution is rectangular, one or more pixels in four corners of the image will not be displayed by the display component. Therefore, the preset region is a region including corners in the image of the second resolution. In an exemplary embodiment, the processing component sets a first pixel in an upper left corner of the image of the second resolution as a black pixel, and adopts the black pixel as the second indication information. Alternatively, a plurality of pixels in the upper left corner of the image of the second resolution may form a graphic 2 to be used as the second indication information.

In step 405, the processing component crops the frame of image of the third resolution into n images of the second resolution. Step 406 is performed.

It should be noted that "the processing component crops the third-resolution image to n second-resolution images" is also understood as "the processing component cuts the third-resolution image to n second-resolution images".

After generating the image of the third resolution, the processing component crops the image of the third resolution into n images of the second resolution, and the third resolution is greater than the second resolution. The data amount of the image of the third resolution may exceed the transmission bandwidth between the processing component and the display component, and it is difficult to transmit the image of the third resolution to the display component at one time, so the processing component crops the image of the third resolution into n images of the second resolution.

In step 406, the processing component successively transmits n images of a second resolution to the display component. Step 407 is performed.

The n images of the second resolution are configured to form a frame of image of a third resolution of the display component such that the display component displays the image of the third resolution at the second frame rate.

Steps 404 to 406 are steps of the processing component transmitting the image to the display component when the posture information does not reach the preset parameter. In the case that the posture information does not reach the preset parameter, the rotation speed of the user's head is lower than or equal to the rotation speed threshold, it indicates that the user's head is not rotating fast. Correspondingly, the picture displayed by the display component is also in a slower and gentler static scene. It can be determined that the display component transmits n images of the second resolution, such that the display component splices the n images of the second resolution into one frame of image and displays the one frame of image as spliced, and the display mode is referred as a "high resolution mode"

The image of the second resolution may be a part of a frame of image displayed on the display screen of the display component, and a plurality of images of the second resolution may form a frame of an image displayed on the display screen. That is, the second resolution may be one-nth of the physical resolution of the display screen, and n images of the second resolution may form the frame of the image displayed on the display screen.

When the display device displays pictures continuously, the processing component transmits n images of the second resolution to the display component at the first frame rate based on steps 404 to 406. The second resolution may be a preset resolution of an image output by the processing component. The first frame rate may be a frequency determined based on the image processing capability of the processing component. The stronger the image processing capability of the processing component, the higher the first frame rate, and the weaker the image processing capability of the processing component, the lower the first frame rate.

Optionally, the first frequency is equal to the first frame rate, such that the frequency may be set as the maximum frequency that the image processing capability of the processing component can bear, so as to make full use of the image processing capability of the processing component. In this case, the second resolution is equal to the first resolution.

Similarly, steps 404 to 406 refer to step 1703 in FIG. 17. The processing component transmits the image of the second resolution to the display component at the first frame rate in the case that the mode information indicates the second mode.

In step 407, the display component receives the image from the processing component.

The display component receives the image provided by the processing component over a line connected to the processing component. The step is similar to step 1704 in FIG. 17.

In step 408, the display component acquires the indication information from the preset region in the image provided by the processing component.

Upon receiving the image from the processing component, the image processing IC in the display component acquires the indication information from the preset region of the image from the processing component and determines whether the indication information is the first indication information or the second indication information. The first indication information indicates the posture information of the user of the XR device reaches the preset parameter, i.e., the high frame rate mode, and the second indication information indicates the posture information of the user of the XR device does not reach the preset parameter, i.e., the high resolution mode.

Similarly, step 408 refers to steps 1705 to 1707 in FIG. 17, and the mode identifier, which is similar to the indication information, indicates whether it is in the high frame rate mode or high resolution mode. If the mode identifier is the first mode identifier, the display component is determined to be in the first mode; if the mode identifier is the second mode identifier, the display component is determined to be in the second mode.

In step 409, in the case that the indication information is the first indication information, the display component splits the received image as the image of the first resolution into a plurality of images. Step 410 is performed.

In the case that the posture information of the user of the XR device reaches the preset parameter, the image processing IC in the display component takes the received image as the image of the first resolution and splits the image of the first resolution into a plurality of images of the fifth resolution, and display the plurality of images of the fifth resolution at the first frame rate. The image processing IC performs splitting in a manner corresponding to the arrangement of the images of the fifth resolution when the processing component generates the image of the first resolution in step 402. In an exemplary embodiment, if the first resolution is 540×2160, the number of images is 4, and the second resolution is 540×540, the image processing IC may split the image of the first resolution into 4 images of a resolution of 540×540.

In step 410, the display component respectively scales up the plurality of frames of images to obtain a plurality of scaled-up images of a target resolution. Step 411 is performed.

The target resolution is equal to the physical resolution of the display component. The fifth resolution is lower, when the physical resolution of the display screen is greater than the image of the fifth resolution, the image processing IC in the display component scales up each frame of images of the fifth resolution to be consistent with the physical resolution of the display screen to achieve a better display effect before transmitting the image of the fifth resolution to the display screen for display.

In step 411, the display component displays the plurality of scaled-up images of the target resolution at the first frame rate.

After acquiring the plurality of scaled-up images of the target resolution, the image processing IC in the display component inputs these scaled-up images to the display component for display at the first frame rate.

Since each image of the first resolution received by the display component may be split into a plurality of scaled-up images for display in a plurality of frames, the first frame rate is numerically greater than the first frequency of the image output by the display component, such that the first frame rate is higher. For example, it may be greater than or equal to 60 frames, such as 90 frames, 120 frames, 144 frames, or 240 frames.

Figure 5:
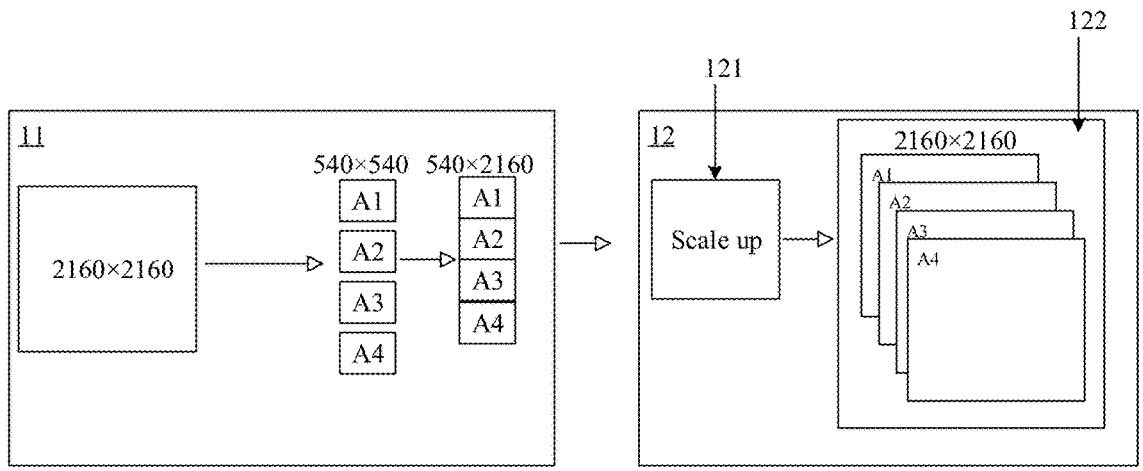
FIG. 5 is a schematic flowchart of a high frame rate mode in the embodiments shown in FIG. 4.

Steps 402, 403, 407, 408, 409, and 411 show the display manner of the high frame rate mode. In an exemplary embodiment, FIG. 5 is a schematic diagram of the display in the high frame rate mode according to an embodiment of the present disclosure. The physical resolution of the display screen 122 is 2160×2160. The processing component 11 renders and processes the image to be displayed of a resolution of 2160×2160 at a resolution of 540×540 (it should be noted that in the processing component, it is possible that the image to be displayed of a resolution of 2160×2160 may not actually exist, but an image of a resolution of 540×540 may be directly acquired), acquires 4 images of a resolution of 540×540 (A1, A2, A3, and A4), then combines these 4 images of a resolution of 540×540 into a image of the first resolution of 540×2160, and transmits the image of the first resolution to the display component 12. The image processing IC in the display component 12 scales up each image in the image of the first resolution to a resolution of 2160×2160 to be displayed on the display screen 122 at a higher first frame rate, such that a high frame rate display mode is realized.

The reduced visual sensitivity of the human eye accompanied by rapid saccades is called saccade suppression. Due to the saccade suppression phenomenon, the human eye is less sensitive to the resolution of the image in a dynamic scene, but sensitive to the frame rate of the image display, so in this case, the image may be displayed at a lower resolution and a higher frame rate to improve user experience.

Similarly, steps 409 to 411 refer to step 1708 in FIG. 17, where the display component splits the received image as the image of the first resolution into a plurality of images of the second resolution and displays the plurality of images of the second resolution at the first frame rate.

In step 412, in the case the indication information is the second indication information and the n images from the processing components are received, the n images from the processing components are spliced into the frame of image, and the frame of image as spliced is displayed at the second frame rate.

Wherein n is greater than or equal to 2. In the case that the indication information is the second indication information, it is indicated that the posture information of the user of the XR device does not reach the preset parameter, the image received by the display component is the image of the second resolution. Since each image of the second resolution is a part of a frame of image displayed on the display screen, n images of the second resolution provided by the processing component constitute the frame of image, the display component splices the n images provided by the processing component into the frame of image and displays the frame of image at the second frame rate upon receiving n images of the second resolution.

The frequency at which the display component receives n images of the second resolution is the same as the frequency at which the processing component transmits the n images of the second resolution, which is the first frame rate.

After the image processing IC in the display component receives n images of the second resolution, the reception of a frame of image is completed. In this case, the n images of the second resolution may be spliced into one image of the third resolution, and the image of the third resolution is transmitted to the display screen for display in one frame. During the transmission, the image processing IC may transmit the n images of the second resolution to the display screen one by one for display, or transmit the image formed by splicing the n images of the second resolution to the display screen for display as a whole.

When the display component receives n images of the second resolution at the first frame rate, the display component may display the image of the third resolution at the second frame rate. The image of the third resolution is composed of n images of the second resolution. Since the display component displays a frame of an image upon receiving n images of the second resolution transmitted by the processing component at the first frame rate, the second frame rate is numerically lower than the first frame rate.

Correspondingly, since each image of the third resolution is composed of n images of the second resolution, the third resolution is also greater than the second resolution. Optionally, the third resolution is a sum of n second resolutions. In an exemplary embodiment, the second resolution is 540×2160 and the number of images of the second resolution in one frame of image is 4, then the third resolution is 2160×2160, and the third resolution is equal to the physical resolution of the display screen.

Figure 6:
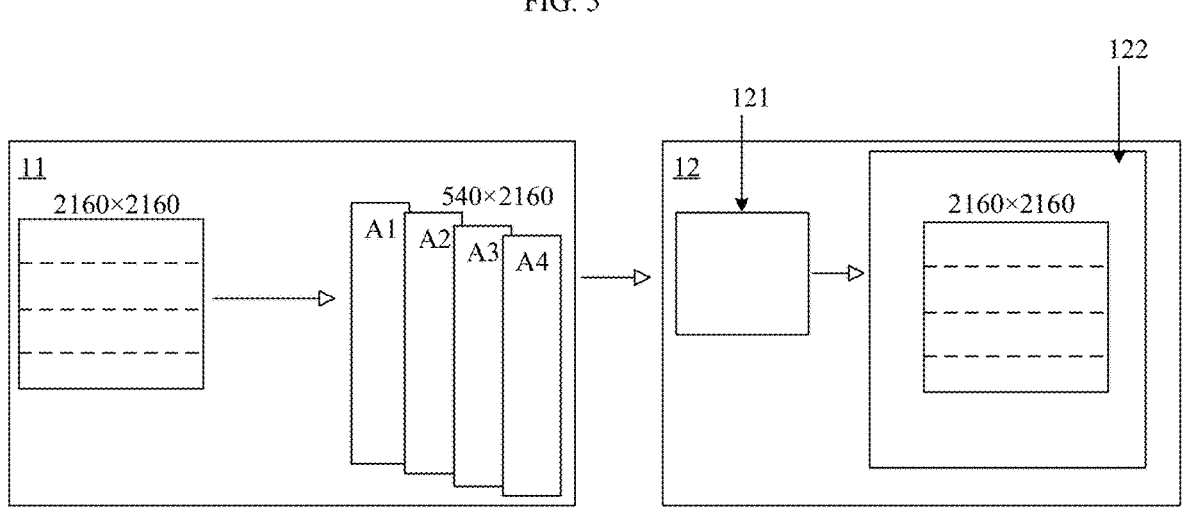
FIG. 6 is a schematic flowchart of a high resolution mode in the embodiments shown in FIG. 4.

In the embodiment of the present disclosure, steps 404, 405, 406, 407, 408, and 412 show the display manner of the high resolution mode. In an exemplary embodiment, FIG. 6 is a schematic diagram of the display in the high resolution mode according to some embodiments of the present disclosure. The physical resolution of the display screen 122 is 2160×2160. The processing component 11 splits an image to be displayed of a resolution of 2160×2160 into four images of a resolution of 540×2160 (A1, A2, A3, and A4) and transmits these 4 images to the display component 12 at the first frame rate. Upon receiving the 4 images of a resolution of 540×2160, the image processing IC in the display component 12 may combine and restore these 4 images of a resolution of 540×2160 into an image of a resolution of 2160×2160 to be displayed on the display screen 122, thus realizing a high-resolution display mode.

In a relatively static scene, the human eye is more sensitive to the resolution of the image, but less sensitive to the frame rate of the image display, so the image can be displayed with a higher resolution and a lower frame rate to improve user experience.

Similarly, step 412 refers to steps 1709, 1710, and 1711 in FIG. 17. The display component receives n images of the first resolution and splices the received n images of the first resolution into one frame of image for display, and the display component displays the image of the third resolution at the second frame rate.

In summary, according to the image processing method provided by the embodiment of the present disclosure, in the cast that the posture information of the user reaches the preset parameter, the image is transmitted to the display component such that the display component displays the image at the higher first frame rate, and in the cast that the posture information of the user does not reach the preset parameter, the image is transmitted to the display component such that the display component displays the image at the lower second frame rate. Two display modes with different frame rates are provided, such that display methods are more abundant and the flexibility is high.

The above embodiments provide a scheme for generating images locally, but in the method provided by the embodiments of the present disclosure, the image may be generated by the server.

Figure 7:
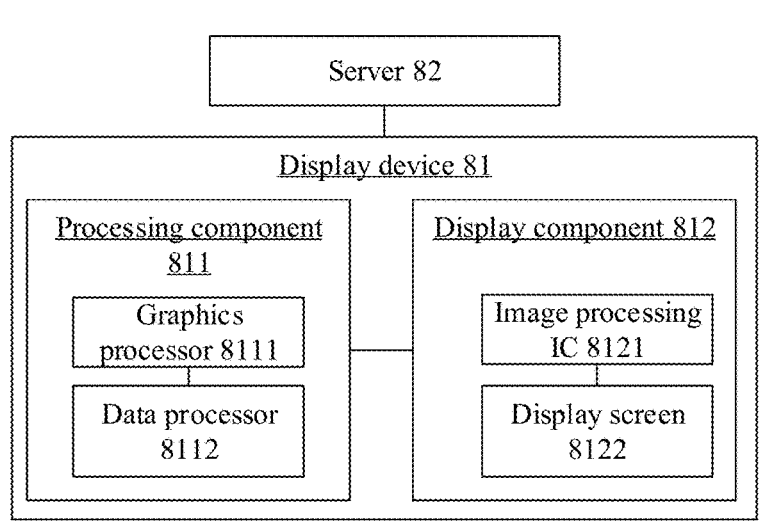
FIG. 7 is a schematic diagram of an application scenario of an image display method according to some embodiments of the present disclosure.

Referring to FIG. 7, which is a schematic diagram of an application scenario of an image display method according to some embodiments of the present disclosure. In the schematic diagram, a display device 81 and a server 82 are provided. The display device 81 and server 82 are connected by wired or wireless means.

The structure of the display device 81 is similar to that of the display device shown in FIG. 1 above and may include a processing component 811 and a display component 812. The processing component 811 includes a graphics processor 8111 and a data processor 8112, and the display component 812 includes an image processing IC 8121 and a display screen 8122.

The server 82 includes one or a cluster of servers, and the server 82 is provided from the cloud.

The server 82 is configured to generate and render images and provide images to the display device 81.

Figure 8:
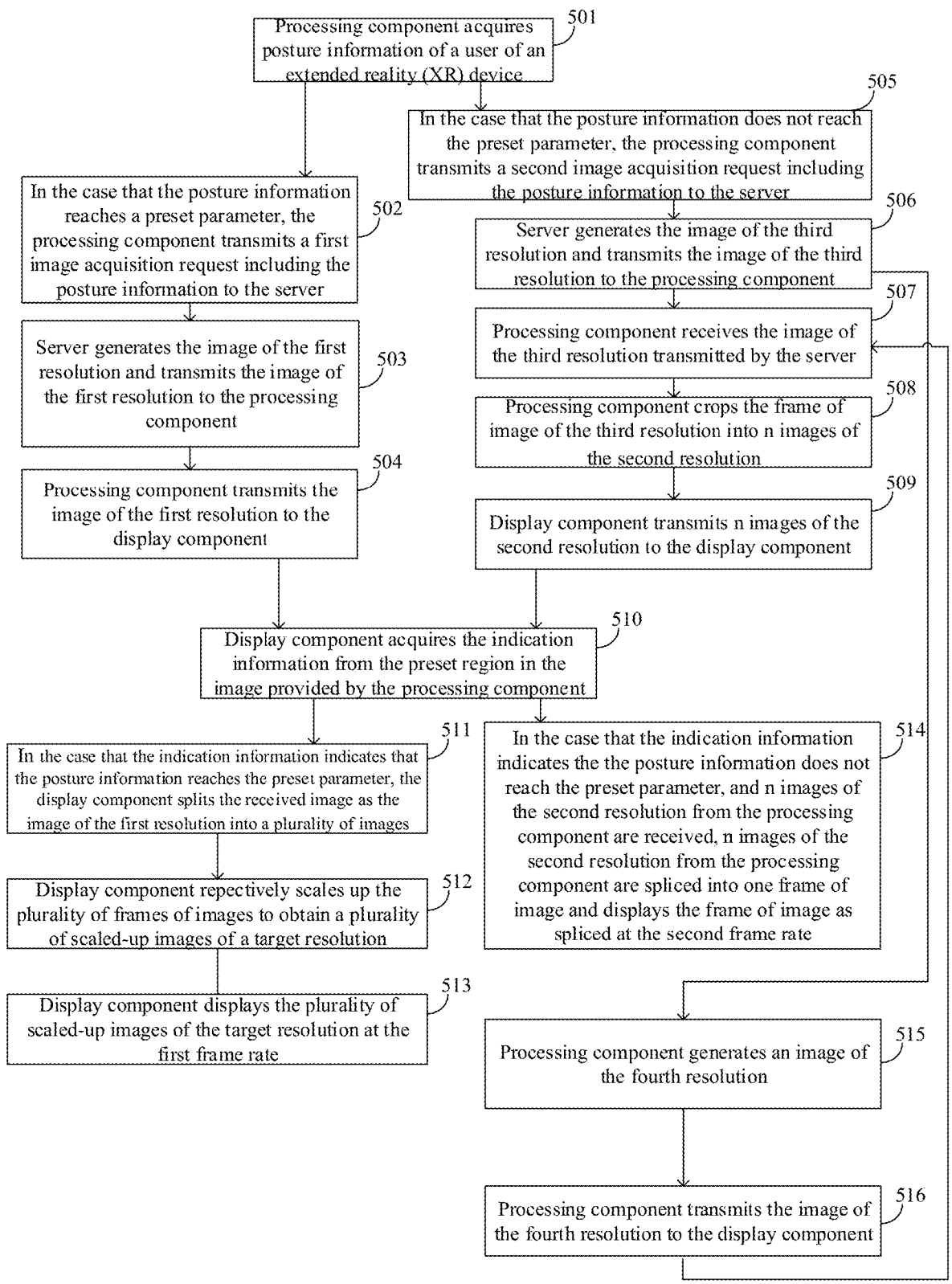
FIG. 8 is a flowchart of still yet another image display method according to some embodiments of the present disclosure.

FIG. 8 is a flowchart of still yet another image display method according to some embodiments of the present disclosure. The image display method is applicable to the application scenario shown in FIG. 7. The image display method may include the following steps.

In step 501, the processing component acquires posture information of a user of an extended reality (XR) device.

The image display method according to the embodiment of the present disclosure is applicable to the XR device. Extended reality is a general term for virtual reality (VR), augmented reality (AR), and mixed reality (MR).

The display device shown in FIG. 7 is a part or all of the XR device.

The XR device includes a processing component and a wearable display. The wearable display may include a head-mounted display or a glasses display. The wearable display may be the display component 812 in the implementation environment shown in FIG. 7.

The sensors in the wearable display include speed sensors, acceleration sensors, and angular velocity sensors, which are used to collect posture information of the user and adjust the picture accordingly. In some embodiments, the posture information of the user is the posture information of the head of the user.

The step can be referred to step 401 in the embodiments shown in FIG. 4 above, which will not be repeated here.

In step 502, in the case that the posture information reaches a preset parameter, the processing component transmits a first image acquisition request including the posture information to the server. Step 503 is performed.

In the embodiments, the processing component may transmit the first image acquisition request including the posture information to the server for the server, such that the server generates the image of the first resolution based on the first image acquisition request. The first image acquisition request further includes the image data of the image of the first resolution to be generated and some parameters of the display device. The image data includes the content information of the image, the resolution information of the image, etc. When applied to the XR device, the parameters of the display device include parameters such as the field of view angle (FOV) of the display device. In addition, the first image acquisition request further includes the identifier information that the posture information reaches the preset parameter, such that the server generates the image based on the identifier information.

When applied to XR devices, the server needs the posture information of the user (such as posture information of the head of the user) when generating images, and then the processing component sets the posture information of the user as acquired in step 501 in the first image acquisition request.

In step 503, the server generates the image of the first resolution and transmits the image of the first resolution to the processing component. Step 504 is performed.

After receiving the first image acquisition request transmitted by the display device, the server of the cloud generates the image of the first resolution based on the first image acquisition request. The image of the first resolution includes a plurality of frames of images. For example, the image of the first resolution is formed by splicing the plurality of frames of images.

When the display device continues to transmit the first image acquisition request, the server continues to generate the image of the first resolution and continues to transmit the image of the first resolution to the display device. Due to the abundant computing power of the server, the image generation speed is fast, and the frequency at which the image of the first resolution is transmitted by the server to the display device is equal to the frequency at which the first image acquisition request is transmitted by the display device to the server. For example, the frequency at which the display device transmits the first image acquisition request to the server is the first frequency, then the server also transmits the image of the first resolution to the display device at the first frequency.

When applied to the XR device, the server generates a matching image of the first resolution based on the first posture information included in the first image acquisition request. In the embodiments, the server encodes the image when generating the image, and correspondingly, the display device decodes the image provided by the server after receiving the image from the server.

In addition, the server generates a plurality of frames of images and transmits the plurality of frames of images to the processing component, and the processing component splices the plurality of frames of images to obtain the image of the first resolution.

In addition, when the server generates the image of the first resolution, an indication identifier may be added to the preset region in the image of the first resolution. Based on the indication identifier, whether the posture information of the user of the XR device reaches the preset parameter is determined. The indication identifier can also refer to the embodiments shown in FIG. 4 above, which is not repeated here.

In addition, the contents of the image of the first resolution can also refer to the embodiments shown in FIG. 4 above, which is not repeated here.

In step 504, the processing component transmits the image of the first resolution to the display component. Step 509 is performed.

After receiving the image of the first resolution provided by the server, the display device transmits the image of the first resolution to the display component by the processing component. The frequency at which the processing component transmits the image of the first resolution to the display component is equal to the frequency at which the server transmits the image of the first resolution to the display device. If the server transmits the image of the first resolution to the display device at the first frequency, then in Step 504, the processing component transmits the image of the first resolution to the display device at the first frequency.

In addition, when the server provides a plurality of frames of images to the processing component, the processing component slices the plurality of frames of images into the image of the first resolution and then transmits the image of the first resolution to the display component.

In step 505, when the posture information does not reach the preset parameter, the processing component transmits a second image acquisition request including the posture information to the server. Step 506 and step 514 are performed.

The second image acquisition request is configured to instruct the server to generate an image of the third resolution and transmit the image of the third resolution to the display device. Similar to the first image acquisition request, the second image acquisition request includes image data of the image of the third resolution to be generated and some parameters for the display device. In addition, the second image acquisition request also includes the identifier information that the posture information does not reach the preset parameter, such that the server generates the image based on the identifier information.

When the display device displays pictures continuously, the processing component transmits the second image acquisition request to the server at the first frame rate.

When applied to XR devices, the server needs the posture information of the head of the user when generating images, and then the processing component sets the posture information obtained in step 501 into the second image acquisition request.

In step 506, the server generates the image of the third resolution and transmits the image of the third resolution to the processing component. Step 507 is performed.

After receiving the second image acquisition request transmitted by the display device, the server of the cloud generates the image of the third resolution based on the second image acquisition request. The image of the third resolution is composed of n images of the second resolution. The image of the third resolution is one frame of image.

When the display device continues to transmit the second image acquisition request, the server continues to generate the image of the third resolution and continues to transmit the image of the third resolution to the display device. Due to the abundant computing power of the server, the image generation speed is fast, and the frequency at which the image to the display device of the third resolution is transmitted by the server is equal to the frequency at which the second image acquisition request is transmitted by the display device to the server.

When applied to an XR device, the server generates a matching image of the third resolution based on the second posture information included in the image acquisition request.

In addition, when the server generates the image of the third resolution, the indication information may be added to the preset region in each image of the second resolution in the images of the third resolution, such that the display component determines whether the posture information reaches the preset parameter based on the indication information. The indication information can also refer to the embodiments shown in FIG. 4 above, which is not repeated here.

In addition, the contents of the image of the third resolution can also refer to the embodiments shown in FIG. 4 above, which is not repeated here.

In step 507, the processing component receives the image of the third resolution transmitted by the server. Step 508 is performed.

The processing component acquires the image of the third resolution from the server. The image of the third resolution can also refer to the embodiments shown in FIG. 4 above, which is not repeated here.

In step 508, the processing component crops the frame of image of the third resolution into n images of the second resolution. Step 509 is performed.

The processing component crops the frame of image of the third resolution into n images of the second resolution. The content of the splitting can also refer to the embodiments shown in FIG. 4 above, which is not repeated here.

Step 509, the display component transmits n images of the second resolution to the display component. Step 510 is performed.

After acquiring the image of the third resolution composed of n images of the second resolution provided by the server, the processing component transmits n images of the second resolution to the display component.

In step 510, the display component acquires the indication information from the preset region in the image provided by the processing component.

Upon receiving the image from the processing component, the image processing IC in the display component acquires the indication information from the preset region in the image from the processing component and determines whether the indication information is the first indication information or the second indication information. The first indication information indicates the posture information of the user of the XR device reaches the preset parameter, and the second indication information indicates the posture information of the user of the XR device does not reach the preset parameter.

In step 511, in the case that the indication information indicates that the posture information reaches the preset parameter, the display component splits the received image as the image of the first resolution into a plurality of images. Step 512 is performed.

When the indication information reaches the preset parameter, and the image processing IC in the display component takes the received image as the image of the first resolution, splits the image of the first resolution into a plurality of images of the fifth resolution, and displays the plurality of images respectively in multiple frames. The image processing IC performs splitting in a manner corresponding to the splicing of the images when the server generates the image of the first resolution in step 503. In an exemplary embodiment, if the first resolution is 540×2160, the number of images is 4, and the second resolution is 540×540, the image processing IC may split the image of the first resolution into 4 images of a resolution of 540×540, and input these images into the display screen for display at the first frame rate.

In step 512, the display component respectively scales up the plurality of frames of images to obtain a plurality of scaled-up images of a target resolution. Step 513 is performed.

The target resolution is equal to the physical resolution of the display component. The fifth resolution is lower, when the physical resolution of the display screen is greater than the image of the fifth resolution, the image processing IC in the display component scales up the image to be consistent with the physical resolution of the display screen to achieve a better display effect before transmitting the image of the fifth resolution to the display screen for display.

In step 513, the display component displays the plurality of scaled-up images of the target resolution at the first frame rate.

After acquiring the plurality of scaled-up images of the target resolution, the image processing IC in the display component inputs these scaled-up images to the display component for display at the first frame rate.

Since each image of the first resolution received by the display component may be split into a plurality of images for display in a plurality of frames after scaling-up processing, the first frame rate is numerically greater than the first frequency of the image output by the display component, such that the first frame rate is higher. For example, it may be greater than or equal to 60 frames, such as 90 frames, 120 frames, 144 frames, or 240 frames.

In step 514, when the indication information indicates the posture information does not reach the preset parameter, and n images of the second resolution from the processing component are received, n images of the second resolution from the processing component are spliced into one frame of image and displays the frame of image as spliced at the second frame rate.

When the indication information indicates the posture information does not reach the preset parameter, after the image processing IC in the display component receives n (which are actually the preset number) images of the second resolution, the reception of a frame of image is completed. In this case, the n images of the second resolution may be spliced into one image of the third resolution, and image of the third resolution is transmitted to the display screen for display in one frame. During the transmission, the image processing IC may transmit the n images of the second resolution to the display screen one by one for display, or transmit the image formed by splicing the n images of the second resolution to the display screen for display as a whole.

When the display component receives n images of the second resolution at the first frame rate, the display component may display the image of the third resolution at the second frame rate. Since each image of the third resolution is composed of n images of the second resolution, the third resolution is also greater than the second resolution. Optionally, the third resolution is the sum of n second resolutions. For example, the second resolution is 540×2160, the number of images of the second resolution in one frame is 4, then the third resolution is 2160×2160, and the third resolution is equal to the physical resolution of the display screen.

In a relatively static scene, the human eye is more sensitive to the resolution of the image, but less sensitive to the frame rate of the image display, so the image can be displayed with a higher resolution and a lower frame rate to improve user experience.

In step 515, the processing component generates an image of the fourth resolution. Step 516 is performed.

In step 505, after transmitting the second image acquisition request to the server, the processing component generates and renders an image of the fourth resolution, which is lower than the third resolution. The data amount of the image of the third resolution is larger. After generating the image of the third resolution, the server may be affected by factors such as the stability of the network and the transmission speed of the network in the process of transmission to the display device, resulting in the difficulty of the image of the third resolution being transmitted to the display device quickly, which may lead to the problem that the display device has no image to display. For this, the processing component generates the image of the smaller fourth resolution locally. Since the fourth resolution is lower than the third resolution, the processing component quickly generates the image of the fourth resolution.

In step 516, the processing component transmits the image of the fourth resolution to the display component. Step 507 is performed.

After generating the image of the fourth resolution, the processing component transmits the image of the fourth resolution to the display component for display. After receiving the image of the third resolution provided by the server, the processing component stops generating the image of the fourth resolution and transmits the image of the third resolution provided by the server to the display component. In addition, before receiving the image of the third resolution provided by the server, the processing component continuously generates and transmits the image of the fourth resolution to the display component, such that the display component always displays pictures.

Figure 9:
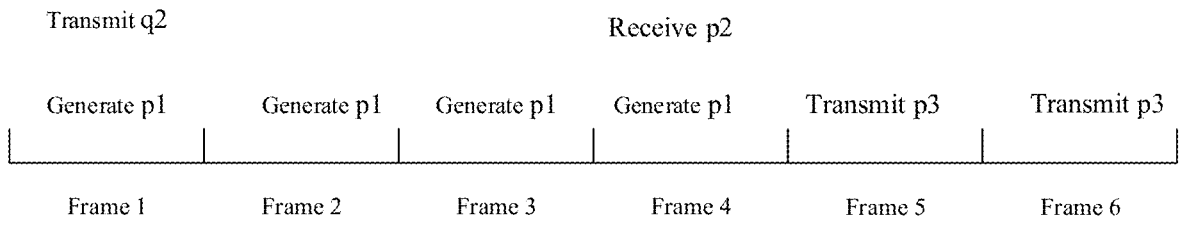
FIG. 9 is a schematic diagram of a display process in the embodiments shown in FIG. 8.

Referring to FIG. 9, FIG. 9 is a schematic diagram of a display process in the embodiments shown in FIG. 8. In frame 1, the processing component transmits a second image acquisition request q2 to the server. From frame 1 to frame 4, the processing component continuously generates and renders 4 frames of image p1 of the fourth resolution locally. After acquiring the image p2 of the third resolution provided by the server in frame 4, the processing component transmits the image p3 of the second resolution included in the image of the third resolution to the display component, which avoids the problem of a white or black screen when the display component has no image to display.

According to the embodiments of the present application, the way for the image to be generated and rendered by the server in both the high frame rate mode and high resolution mode is provided. And the image is further generated and rendered locally by the display device in either the high frame rate mode or high resolution mode. The embodiments shown in FIG. 4 above can be referred to in the way the display device generates and renders images locally, and the embodiments of the disclosure are not repeated here.

In summary, according to the image processing method provided by the embodiment of the present disclosure, in the cast that the posture information of the user reaches the preset parameter, the image is transmitted to the display component such that the display component displays the image at the higher first frame rate, and in the cast that the posture information of the user does not reach the preset parameter, the image is transmitted to the display component such that the display component displays the image at the lower second frame rate. Two display modes with different frame rates are provided, such that display methods are more abundant and the flexibility is high.

Figure 10:
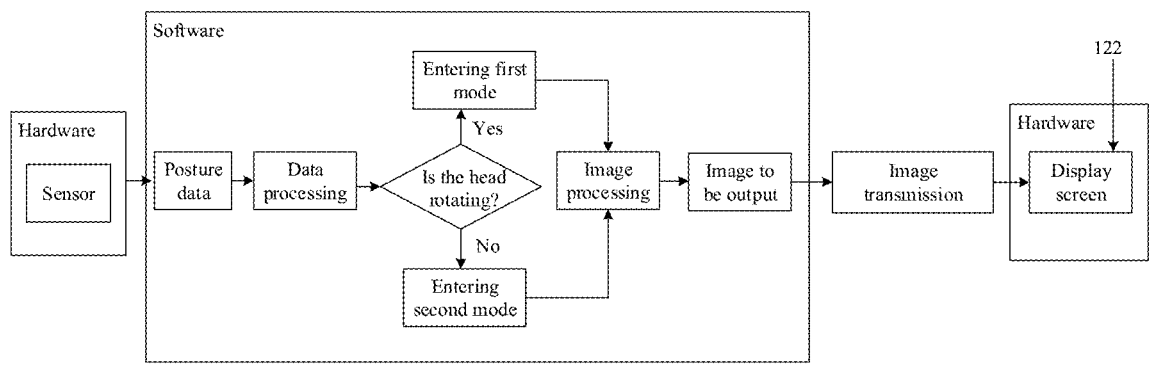
FIG. 10 is a schematic flowchart of a system in the embodiments shown in FIG. 4.

In the embodiment of the present disclosure, the display mode is determined by whether the human head rotates quickly. The system flowchart of this method may be as shown in FIG. 10. A sensor of a hardware part may acquire posture information of a user's head. After the posture information is transmitted to the software part, a software part may determine whether the head is rotating rapidly or not based on the posture information through data processing. When the head rotates rapidly, it enters the high frame rate mode. When the head does not rotate rapidly, it enters the high resolution mode, image processing is performed (the image processing process may be made reference to the above embodiment, and is not repeated here) to acquire an image to be output, and the image to be output is output to a display screen of the hardware part for display.

By means of this display method, if an angular velocity of the user's head on a certain axis (such as an x-axis vertical to the ground) gradually increases (the head is in a state of starting to rotate) and is greater than a threshold, it may enter the high frame rate mode for display. When the angular velocity of the user's head is greater than the threshold and continues to increase to a certain angular velocity and keep remained (the head is in a state of rotating in this case), the high frame rate mode may be maintained for display. When the angular velocity of the user's head decreases and is lower than the threshold (the head is in a state of stopping rotation in this case), it can be switched to the high resolution mode for display.

Figure 11:
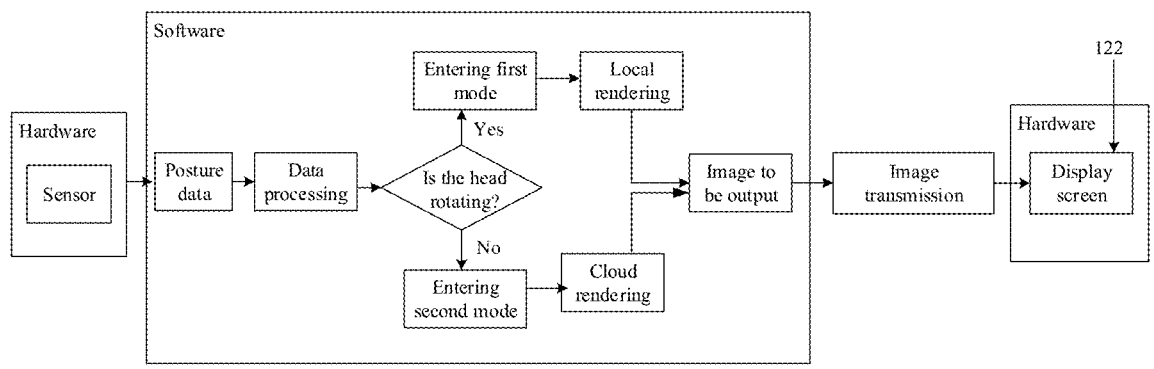
FIG. 11 is a schematic flowchart of another system according to some embodiments of the present disclosure.

In addition, the process for generating and rendering images based on local and cloud can be referred to FIG. 11, which is a schematic flowchart of another system according to some embodiments of the present disclosure. In the high frame rate mode, the image is generated and rendered locally by the display device and is output, in the high resolution mode, the image is generated and rendered by the server of the cloud and provided to the display device.

Figure 12:
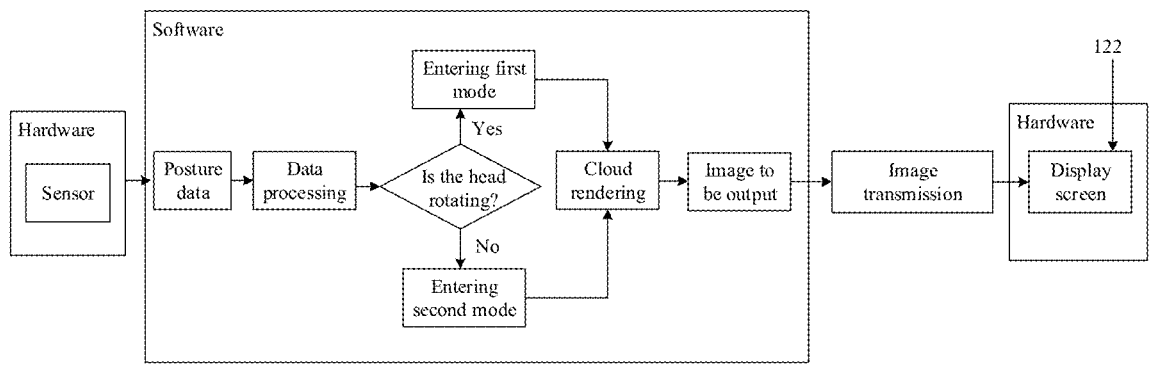
FIG. 12 is a schematic flowchart of yet another system according to some embodiments of the present disclosure.

The process for generating and rendering images based on the cloud can be referred to FIG. 12, which is a schematic flowchart of another system according to some embodiments of the present disclosure. In FIG. 12, in both high frame rate mode and high resolution mode, the images are generated and rendered by the server in the cloud, which reduces the hardware requirements for the display device.

FIG. 1 is a block diagram of a display device according to an embodiment of the present disclosure. The display device 10 includes a processing component 11 and a display component 12.

The processing component 11 is configured to acquire posture information of a user of the XR device.

In the case that the posture information reaches a preset parameter, the processing component 11 transmits an image to the display component 12 and the display component 12 displays the image at a first frame rate; and in the case that the posture information does not reach the preset parameter, the processing component 11 transmits an image to the display component 12 and the display component 12 displays the image at a second frame rate, the second frame rate being lower than the first frame rate.

In some embodiments, the processing component 11 is configured to transmit an image of a first resolution to the display component 12, wherein the image of the first resolution includes a plurality of images.

The display component 11 is configured to scale up the plurality of images into a plurality of images of a target resolution and display the plurality of images of the target resolution at the first frame rate, the target resolution being equal to a physical resolution of the display component 12.

In some embodiments, the processing component 11 is configured to successively transmit at least two images of a second resolution to the display component 12, wherein the at least two images of the second resolution are configured to form a frame of image of a third resolution of the display component 12.

The display component 12 is configured to display the image of the third resolution at the second frame rate.

In summary, according to the image display device provided by the embodiments of the present disclosure, in the cast that the posture information of the user reaches the preset parameter, the image is transmitted to the display component such that the display component displays the image at the higher first frame rate, and in the cast that the posture information of the user does not reach the preset parameter, the image is transmitted to the display component such that the display component displays the image at the lower second frame rate. Two display modes with different frame rates are provided, such that display methods are more abundant and the flexibility is high.

Figure 13:
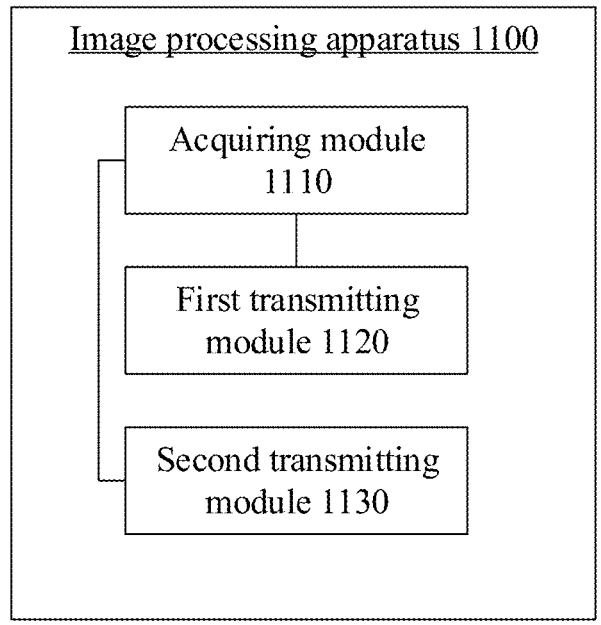
FIG. 13 is a block diagram of an image display apparatus according to an embodiment of the present disclosure.

FIG. 13 is a structural block diagram of an image processing apparatus according to an embodiment of the present disclosure. The image processing apparatus may be integrated into the processing component of the implementation environment shown in FIG. 1 through hardware or software. The image processing apparatus 1100 includes the following modules.

An acquiring module 1110 is configured to acquire posture information of a user of the XR device.

A first transmitting module 1120 is configured to transmit an image to the display component such that the display component displays the image at a first frame rate in response to the posture information of the user of the XR device reaching a preset parameter.

A second transmitting module 1130 is configured to transmit an image to the display component such that the display component displays the image at a second frame rate in response to the posture information of the user of the XR device not reaching the preset parameter, the second frame rate being lower than the first frame rate.

In summary, according to the image processing apparatus provided by the embodiments of the present disclosure, in the cast that the posture information of the user reaches the preset parameter, the image is transmitted to the display component such that the display component displays the image at the higher first frame rate, and in the cast that the posture information of the user does not reach the preset parameter, the image is transmitted to the display component such that the display component displays the image at the lower second frame rate. Two display modes with different frame rates are provided, such that display methods are more abundant and the flexibility is high.

Optionally, the first transmitting module 1120 is configured to:

transmit an image of a first resolution to the display component, wherein the image of the first resolution includes a plurality of images, and one of plurality of images scaled up to an image of a target resolution is a frame of image of the display component, the target resolution being equal to a physical resolution of the display component.

Optionally, the second transmitting module 1130 is configured to:

successively transmit at least two images of a second resolution to the display component, wherein the at least two images of the second resolution are configured to form a frame of image of a third resolution of the display component such that the display component displays the image of the third resolution at the second frame rate.

Optionally, the image display apparatus 1100 further includes a splicing module, and the splicing module is configured to:

acquire the plurality of images; and
splice the plurality of images into the image of the first resolution.

Optionally, the image display apparatus 1100 further includes a requesting module, and the requesting module is configured to:

acquire first posture information of a head of the user of the XR device;
transmit a first image acquisition request including the first posture information to a server; and
receive the image of the first resolution from the server.

Optionally, the image display apparatus 1100 further includes a third acquiring module, and the third receiving module is configured to:

acquire the image of the third resolution; and
crop the image of the third resolution into the at least two images of the second resolution.

Optionally, the third acquiring module is configured to:
acquire posture information at a current moment of a head of the user of the XR device; and
acquire the image of the third resolution based on the posture information at the current moment.

Optionally, the third acquiring module is configured to:
acquire second posture information of a head of the user of the XR device;
transmit a second image acquisition request including the second posture information to a server; and
receive the image of the third resolution from the server.

Optionally, the image display apparatus 1100 further includes a fourth acquiring module, and the fourth acquiring module is configured to:

generate an image of a fourth resolution, wherein the fourth resolution is lower than the third resolution;
transmit the image of the fourth resolution to the display component; and
stop generating the image of the fourth resolution in response to receiving the image of the third resolution from the server.

Optionally, the first transmitting module 1120 is configured to:

generate the image of the first resolution with first virtual image data in a preset region, wherein the first virtual image data indicates the posture information of the user of the XR device reaches the preset parameter; and transmit the image of the first resolution with the first virtual image data in the preset region to the display component.

Optionally, the second transmitting module 1130 is configured to:

generate the at least two images of the second resolution with second virtual image data in a preset region, wherein the second virtual image data indicates the posture information of the user of the XR device does not reach the preset parameter; and transmit the at least two images of the second resolution with the second virtual image data in the preset region to the display component.

Optionally, the posture information of the user of the XR device includes a rotation speed of a head of the user, and the preset parameter includes a rotation speed threshold.

Figure 14:
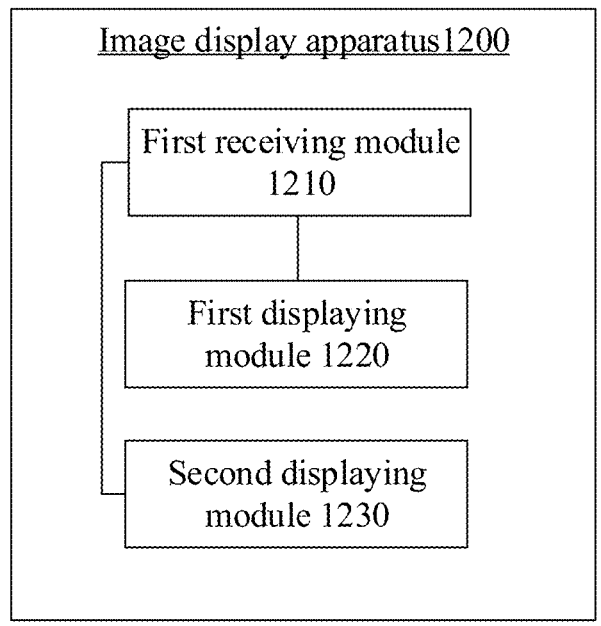
FIG. 14 is a block diagram of an image display apparatus according to another embodiment of the present disclosure.

FIG. 14 is a structural block diagram of an image display apparatus according to an embodiment of the present disclosure. The image display apparatus may be integrated into the display component of the implementation environment shown in FIG. 1 through hardware or software. The image display apparatus 1200 includes the following modules.

A first receiving module 1210 is configured to receive an image from the processing component.

A first displaying module 1220 is configured to display the image from the processing component at a first frame rate in response to posture information of a user of the XR device reaching a preset parameter.

A second displaying module 1230 is configured to display the image from the processing component at a second frame rate in response to the posture information of the user of the XR device not reaching the preset parameter, the second frame rate being lower than the first frame rate.

In summary, according to the image display apparatus provided by the embodiments of the present disclosure, in the cast that the posture information of the user reaches the preset parameter, the image is transmitted to the display component such that the display component displays the image at the higher first frame rate, and in the cast that the posture information of the user does not reach the preset parameter, the image is transmitted to the display component such that the display component displays the image at the lower second frame rate. Two display modes with different frame rates are provided, such that display methods are more abundant and the flexibility is high.

Optionally, the first displaying module 1220 is configured to:

split the image into a plurality of images;
scale up the plurality of images into a plurality of images of a target resolution, wherein the target resolution is equal to a physical resolution of the display component; and
display the plurality of images of the target resolution at the first frame rate.

Optionally, the second displaying module 1230 is configured to:

splice at least two images from the processing component into one image; and display the image as spliced at the second frame rate.

Optionally, the image display apparatus 1200 further includes an indicating module, and the indicating module is configured to:

acquire indication information sent by the processing component; and
determine, based on the indication information, whether the posture information of the user of the XR device reaches the preset parameter or not.

Optionally, the indicating module is configured to:
acquire the virtual image data from a preset region in the image from the processing component.

According to another aspect of the present disclosure, an image display device is also provided. The image display device includes a processor and a memory storing at least one instruction, at least a program, a code set or an instruction set therein, wherein the processor, when loading and executed the at least one instruction, the at least one program, the code set or the instruction set, is caused to perform the image display method as described above.

According to another aspect of the present disclosure, a computer storage medium is provided. The computer storage medium stores at least one instruction, at least one program, a code set or an instruction set, wherein the at least one instruction, the at least one program, the code set or the instruction set, when loaded and executed by a processor, causes the processor to perform the image display method as described above.

According to another aspect of the present disclosure, a computer program product or computer program is provided. The computer program product or computer program includes computer instructions, and the computer instructions are stored in a computer-readable storage medium. A processor of A computer device reads the computer instructions from the computer-readable storage medium, and executes the computer instructions, such that the computer device performs the methods according to various optional implementations described above.

In a first aspect of the present disclosure, an image display method is provided. The method is applicable to a processing component and includes:
acquiring mode information;
transmitting a first image of a first resolution to a display component at a first frequency in the case that the mode information indicates a first mode, wherein the first image is formed by splicing a plurality of sub-images of a second resolution; and
transmitting a second image of the first resolution to the display component at a third frequency in the case that the mode information indicates a second mode, wherein n second images form a frame of image of the display component, and n≥2.

Optionally, transmitting the first image of the first resolution to the display component at the first frequency in the case that the mode information indicates the first mode includes:
acquiring the plurality of sub-images of the second resolution in the case that the mode information indicates the first mode; and
splicing the plurality of sub-images into the first image of the first resolution.

Optionally, transmitting the second image of the first resolution to the display component at the third frequency in the case that the mode information indicates the second mode includes:
acquiring a third image of a third resolution in the case that the mode information indicates the second mode;
cropping the third image into the n second images of the first resolution; and
transmitting the second image of the first resolution to the display component at the third frequency.

Optionally, transmitting the first image of the first resolution to the display component at the first frequency includes:
generating the first image of the first resolution with a first mode identifier; and
transmitting the first image of the first resolution with the first mode identifier to the display component.

Optionally, transmitting the second image of the first resolution to the display component at the third frequency includes:
generating the second image of the first resolution with a second mode identifier; and
transmitting the second image of the first resolution with the second mode identifier to the display component.

Optionally, the method is applicable to the processing component in a virtual reality device, and acquiring the mode information includes:
acquiring posture information of a user's head;
determining a rotation speed of the head based on the posture information;
determining that the mode information indicates the first mode in response to the rotation speed being greater than a threshold; and
determining that the mode information indicates the second mode in response to the rotation speed being less than or equal to the threshold.

In a second aspect, an image display method is provided. The method is applicable to a display component and includes:
receiving an image of a first resolution;
acquiring a mode identifier, wherein the mode identifier is configured to indicate that the image is in a first mode or a second mode;
in the case that the image is in the first mode, splitting the image as a first image into a plurality of sub-images of a second resolution, and displaying the plurality of sub-images of the second resolution at a second frequency;
in the cast that the image is in the second mode, receiving n−1 images of the first resolution, and n≥2; and
splicing the received n images of the first resolution into a frame of image for display.

Optionally, acquiring the mode identifier includes:
acquiring the mode identifier in the image.

Optionally, in the case that the image is in the first mode, splitting the image as the first image into the plurality of sub-images of the second resolution, and displaying the plurality of sub-images of the second resolution at the second frequency includes:
cropping the image of the first resolution into the plurality of sub-images of the second resolution in the case that the image is in the first mode; and
scaling up the sub-images of the second resolution into an image of a third resolution and displaying the image of the third resolution at the second frequency.

Optionally, after displaying the received n images of the first resolution as n second images in a frame for display, the method further includes:
displaying a third image of a third resolution at a fourth frequency, wherein the third image is composed of the n second images, the fourth frequency being lower than the second frequency, and the third resolution being greater than the first resolution.

In a third aspect, a display device is provided. The display device includes a processing component and a display component, wherein
the processing component is configured to acquire mode information;
the processing component is configured to, in the case that the mode information indicates a first mode, transmit a first image of a first resolution to the display component at a first frequency, wherein the first image is formed by splicing a plurality of sub-images of a second resolution;

the display component is configured to display a plurality of second sub-images in the first image at a second frequency, wherein the second frequency is greater than the first frequency;

the processing component is configured to, in the case that the mode information indicates a second mode, transmit a second image of the first resolution to the display component at a third frequency; and the display component is configured to, upon receiving n second images, splice the n second images into a frame of image for display, where n≥2.

In a fourth aspect, an image processing apparatus is provided. The apparatus is applicable to a processing component and includes:

an acquiring module, configured to acquire mode information;

a first transmitting module, configured to transmit a first image of a first resolution to a display component at a first frequency in the case that the mode information indicates a first mode, wherein the first image is formed by splicing a plurality of sub-images of a second resolution; and a second transmitting module, configured to transmit a second image of the first resolution to the display component at a third frequency in the case that the mode information indicates a second mode, wherein n second images form a frame of image of the display component, and n≥2.

In a fifth aspect, an image display apparatus is provided. The apparatus is applicable to a display component and includes:

a first receiving module, configured to receive an image of a first resolution;

a determining module, configured to acquire a mode identifier, wherein the mode identifier is configured to indicate that the image is in a first mode or a second mode;

a first display module, configured to, in the case that the image is in the first mode, split the image as a first image into a plurality of sub-images of a second resolution, and display the plurality of sub-images of the second resolution at a second frequency;

a second receiving module, configured to, in the cast that the image is in the second mode, receive n−1 images of the first resolution, and n≥2; and a second display module, configured to splice the received n images of the first resolution into a frame of image for display.

In a sixth aspect, an image display device is provided. The image display device includes a processor and a memory storing at least one instruction, at least a program, a code set, or an instruction set therein, wherein the processor, when loading and executing the at least one instruction, the at least one program, the code set or the instruction set, is caused to perform the image display method as described above.

In a seventh aspect, a computer storage medium is provided. The computer storage medium stores at least one instruction, at least one program, a code set, or an instruction set, wherein the at least one instruction, the at least one program, the code set or the instruction set, when loaded and executed by a processor, causes the processor to perform the image display method as described above.

In the present disclosure, the terms "first", "second", "third" and "fourth" are merely used for descriptive purposes, and cannot be understood as indicating or implying relative importance. The term "a plurality of" refers to two or more, unless specifically defined otherwise.

In the embodiments according to the present disclosure, it should be understood that the disclosed apparatus and method may be implemented in other ways. For example, the apparatus embodiments described above are merely illustrative. For example, the division of the units is merely a logical function division, and there may be other divisions in actual implementation. For example, a plurality of units or components may be combined or integrated into another system, or some features may be ignored or not implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be disposed in one place, or they may be distributed to a plurality of network units. Some or all of the units may be selected according to actual needs to achieve the objectives of the solutions of the embodiments.

Those of ordinary skill in the art can understand that all or part of the steps in the above embodiments may be implemented by hardware, or by a program to instruct related hardware. The program may be stored in a computer-readable storage medium. The above storage medium may be a read-only memory, a magnetic disk or an optical disk and the like.

Described above are merely optional embodiments of the present disclosure, and are not intended to limit the present disclosure. Within the spirit and principles of the disclosure, any modifications, equivalent substitutions, improvements, and the like are within the protection scope of the present disclosure.

The invention claimed is:

1. An image display method, applicable to a display component of an extended reality (XR) device, wherein the XR device further comprises a processing component and the image display method comprises:

receiving an image from the processing component;

displaying the image from the processing component at a first frame rate in response to posture information of a user of the XR device reaching a preset parameter; and displaying the image from the processing component at a second frame rate in response to the posture information of the user of the XR device not reaching the preset parameter, the second frame rate being lower than the first frame rate.

2. The image display method according to claim 1, wherein in a case that the posture information of the user of the XR device reaches the preset parameter, the image from the processing component is an image obtained by splicing a plurality of frames of images, and displaying the image from the processing component at the first frame rate comprises:

splitting the image from the processing component into the plurality of frames of images;

respectively scaling up the plurality of frames of images to obtain a plurality of scaled-up images of a target resolution, wherein the target resolution is equal to a physical resolution of the display component; and displaying the plurality of scaled-up images of the target resolution at the first frame rate.

3. The image display method according to claim 1, wherein in a case that the posture information of the user of the XR device does not reach the preset parameter, the image from the processing component is one of n images obtained by cropping a frame of image, and displaying the image from the processing component at the second frame rate comprises:

in the case that the posture information of the user of the XR device does not reach the preset parameter and the n images from the processing component are received, splicing the n images from the processing component into the frame of image and displaying the frame of image as spliced at the second frame rate, wherein n is greater than or equal to 2.

4. The image display method according to claim 1, further comprising:

acquiring indication information transmitted by the processing component, wherein the indication information is determined by the processing component based on the posture information of the user provided by a sensor; and determining, based on the indication information, whether the posture information of the user of the XR device reaches the preset parameter or not.

5. The image display method according to claim 4, wherein acquiring the indication information transmitted by the processing component comprises:

acquiring the indication information from a preset region in the image from the processing component.

6. An image processing method, applicable to a processing component of an extended reality (XR) device, wherein the XR device further comprises a display component, and the image processing method comprises:

acquiring posture information of a user of the XR device provided by a sensor;

transmitting an image to the display component such that the display component displays the image at a first frame rate in response to the posture information of the user of the XR device reaching a preset parameter; and transmitting an image to the display component such that the display component displays the image at a second frame rate in response to the posture information of the user of the XR device not reaching the preset parameter, the second frame rate being lower than the first frame rate.

7. The image processing method according to claim 6, wherein transmitting the image to the display component such that the display component displays the image at the first frame rate comprises:

acquiring an image of a first resolution, wherein the image of the first resolution is obtained by splicing a plurality of frames of images; and transmitting the image of the first resolution to the display component, wherein the display component is configured to scale up the plurality of frames of images to obtain a plurality of scaled-up images and display the plurality of scaled-up images at the first frame rate.

8. The image processing method according to claim 7, wherein acquiring the image of the first resolution comprises:

acquiring a plurality of frames of images; and splicing the plurality of frames of images into the image of the first resolution.

9. The image processing method according to claim 7, wherein acquiring the image of the first resolution comprises:

transmitting a first image acquisition request comprising the posture information to a server; and receiving the image of the first resolution from the server.

10. The image processing method according to claim 7, wherein acquiring the image of the first resolution comprises:

transmitting a first image acquisition request comprising the posture information to a server;

receiving a plurality of frames of images from the server; and splicing the plurality of frames of images into the image of the first resolution.

11. The image processing method according to claim 6, wherein transmitting the image to the display component such that the display component displays the image at the second frame rate comprises:

obtaining a frame of image of a third resolution;

cropping the frame of image of the third resolution into n images of the second resolution, wherein n is greater than or equal to 2; and successively transmitting the n images of the second resolution to the display component, wherein the n images of the second resolution are configured to form the frame of image of the third resolution of the display component such that the display component displays the image of the third resolution at the second frame rate.

12. The image processing method according to claim 11, wherein acquiring the frame of image of the third resolution comprises:

acquiring posture information at a current moment of a head of the user of the XR device; and acquiring the image of the third resolution based on the posture information at the current moment.

13. The image processing method according to claim 11, wherein acquiring the image of the third resolution comprises:

transmitting a second image acquisition request comprising the posture information to a server; and receiving the image of the third resolution from the server.

14. The image processing method according to claim 13, wherein after transmitting the second image acquisition request comprising the second posture information to the server, the image processing method further comprises:

generating an image of a fourth resolution, wherein the fourth resolution is lower than the third resolution;

transmitting the image of the fourth resolution to the display component; and stopping generating the image of the fourth resolution in response to receiving the image of the third resolution from the server.

15. The image processing method according to claim 7, wherein a preset region in the image of the first resolution comprises first indication information, and the first indication information indicates to the display component that the posture information reaches the preset parameter.

16. The image processing method according to claim 11, wherein a preset region in the image of the second resolution comprises second indication information, and the second indication information indicates to the display component that the posture information does not reach the preset parameter.

17. The image processing method according to claim 6, wherein the posture information of the user of the XR device comprises a rotation speed of a head of the user, and the preset parameter comprises a rotation speed threshold.

18. An extended reality (XR) device, comprising a processing component and a display component, wherein
the processing component is configured to acquire posture information of a user of the XR device provided by a sensor;
in a case that the posture information of the user of the XR device reaches a preset parameter, the processing component transmits an image to the display component and the display component displays the image at a first frame rate; and
in a case that the posture information of the user of the XR device does not reach the preset parameter, the processing component transmits an image to the display component and the display component displays the image at a second frame rate, the second frame rate being lower than the first frame rate.

19. The XR device according to claim 18, wherein the processing component is configured to obtain a plurality of frames of images, and splice the plurality of frames of images into an image of a first resolution;
the processing component is configured to transmit the image of the first resolution to the display component;
the display component is configured to split the image of the first resolution into the plurality of frames of images; and
the display component is configured to respectively scale up the plurality of frames of images to obtain a plurality of scaled-up images of a target resolution and display the plurality of scaled-up images of the target resolution at the first frame rate, the target resolution being equal to a physical resolution of the display component.

20. The XR device according to claim 18, wherein the processing component is configured to obtain a frame of image of a third resolution;
the processing component is configured to crop the frame of image of the third resolution into n images of the second resolution and transmit the n images of the second resolution to the display component, wherein n is greater than or equal to 2; and
the display component is configured to splice the n images of the second resolution into the frame of image of the third resolution and display the frame of image of the third resolution at the second frame rate.

* * * * *